US012708924B2

(12) United States Patent
Pohl et al.

(10) Patent No.: US 12,708,924 B2
(45) Date of Patent: Aug. 18, 2026

(54) COATING HUMIDIFICATION SYSTEM

(71) Applicant: ARMSTRONG WORLD INDUSTRIES, INC., Lancaster, PA (US)

(72) Inventors: James M. Pohl, Ephrata, PA (US); Christine J. Baldwin, Pensacola, FL (US); Jeffrey A. Hake, Mount Wolf, PA (US); William H. Frantz, Elizabethtown, PA (US)

(73) Assignee: AWI Licensing LLC, Wilmington, DE (US)

( * ) Notice: Subject to any disclaimer, the term of this patent is extended or adjusted under 35 U.S.C. 154(b) by 0 days.

(21) Appl. No.: 18/429,060

(22) Filed: Jan. 31, 2024

(65) Prior Publication Data

US 2024/0165652 A1 May 23, 2024

Related U.S. Application Data

(63) Continuation of application No. 17/349,701, filed on Jun. 16, 2021, now Pat. No. 11,919,033.

(60) Provisional application No. 63/044,613, filed on Jun. 26, 2020.

(51) Int. Cl.

| | |
|---|---|
| ***B05D 3/00*** | (2006.01) |
| ***B05B 16/40*** | (2018.01) |
| ***B05B 16/60*** | (2018.01) |
| ***B05C 5/02*** | (2006.01) |
| ***B05C 9/12*** | (2006.01) |
| ***B05D 3/04*** | (2006.01) |

(52) U.S. Cl.

CPC ............ *B05C 5/0204* (2013.01); *B05B 16/40* (2018.02); *B05B 16/60* (2018.02); *B05C 9/12* (2013.01); *B05D 3/0466* (2013.01)

(58) Field of Classification Search

CPC .................................. B05D 3/00; H01L 21/00

See application file for complete search history.

(56) References Cited

U.S. PATENT DOCUMENTS

| | | | |
|---|---|---|---|
| 3,857,511 | A | 12/1974 | Govindan |
| 4,132,357 | A | 1/1979 | Blackinton |
| 4,173,924 | A | 11/1979 | Bradshaw |
| 4,185,975 | A | 1/1980 | Scharf |
| 4,380,321 | A | 4/1983 | Culbertson |
| 4,532,148 | A | 7/1985 | Vecellio |

(Continued)

FOREIGN PATENT DOCUMENTS

| | | | |
|---|---|---|---|
| EP | 1994990 | B1 | 2/2010 |
| JP | 2004298941 | A * | 10/2004 |

(Continued)

OTHER PUBLICATIONS

JP-2004298941 English Translated, (Year: 2004).*

*Primary Examiner* — Gordon Baldwin
*Assistant Examiner* — Mohammad Mayy
(74) *Attorney, Agent, or Firm* — Patrick Sheldrake

(57) ABSTRACT

Described herein is a coating system comprising an applicator head that is configured to apply a coating to a surface of a workpiece, a shroud comprising a housing and an internal cavity located inside of the housing, and a humidifying apparatus comprising an output that is fluidly coupled to the shroud, wherein the humidifying apparatus configured to introduce a quantity of humid air to the internal cavity of the shroud.

19 Claims, 21 Drawing Sheets

(56) References Cited

U.S. PATENT DOCUMENTS

| | | | | |
|---|---|---|---|---|
| 4,857,367 | A | 8/1989 | Thorn | |
| 5,090,972 | A | 2/1992 | Eller | |
| 5,143,552 | A | 9/1992 | Moriyama | |
| 5,298,072 | A | 3/1994 | Shiele | |
| 5,397,606 | A | 3/1995 | Jeffs | |
| 5,554,587 | A * | 9/1996 | Capeci | C11D 11/0082 264/117 |
| 5,783,117 | A * | 7/1998 | Byassee | F24F 6/043 261/107 |
| 5,862,988 | A | 1/1999 | Van Der Steur | |
| 6,171,653 | B1 | 1/2001 | Kohl | |
| 6,227,526 | B1 * | 5/2001 | Morton | F24F 11/30 261/115 |
| 6,383,057 | B1 | 5/2002 | Bartlett | |
| 7,255,747 | B2 | 8/2007 | Ishikawa | |
| 8,453,597 | B2 | 6/2013 | Ansorge | |
| 8,900,366 | B2 | 12/2014 | Rosenblum | |
| 9,512,531 | B2 | 12/2016 | Vijay | |
| 2002/0004100 | A1 | 1/2002 | Gurer | |
| 2005/0166838 | A1 | 8/2005 | Smith | |
| 2006/0093912 | A1 * | 5/2006 | Mayer | H01M 4/21 423/559 |
| 2006/0134340 | A1 * | 6/2006 | Ishikawa | H01L 21/67178 118/52 |
| 2006/0210701 | A1 | 9/2006 | Chappa | |
| 2008/0057616 | A1 * | 3/2008 | Robinson | H10F 77/126 257/E31.027 |
| 2008/0182358 | A1 * | 7/2008 | Cowdery-Corvan | C23C 16/407 257/E21.09 |
| 2014/0220249 | A1 | 8/2014 | Rouaud | |
| 2014/0319241 | A1 | 10/2014 | Nalin | |
| 2015/0069149 | A1 | 3/2015 | Nalin | |
| 2017/0274552 | A1 * | 9/2017 | Chen | B27K 3/34 |

FOREIGN PATENT DOCUMENTS

| | | | |
|---|---|---|---|
| JP | 2009-112999 | A | 5/2009 |
| JP | 2017-183751 | A | 10/2017 |
| KR | 10-2014-0064829 | A | 5/2014 |
| WO | WO 1991/018682 | A1 | 12/1991 |
| WO | WO 2002/053296 | A1 | 7/2002 |
| WO | WO 2004/082851 | A1 | 9/2004 |

* cited by examiner

COATING HUMIDIFICATION SYSTEM

CROSS-REFERENCE TO RELATED APPLICATIONS

This application is a continuation of U.S. patent application Ser. No. 17/349,701, filed on Jun. 16, 2021, which claims the benefit of U.S. Provisional Patent Application No. 63/044,613, filed on Jun. 26, 2020. The disclosure of the above application is incorporated herein by reference.

BACKGROUND

Edge-coating a workpiece as it moves along in a direction generally parallel to its edge is generally known. Systems have been developed that spray the passing edge with a liquid and then vacuum the excess liquid off the edge in order to obtain a smooth and uniform coating of the liquid on edge of the workpiece. Problems with these previous attempts exist, however, in that the coating composition requires low solids contents to avoid clumping. Therefore, a need exists for improved edge-coating systems capable of applying coating composition having higher solids contents.

BRIEF SUMMARY

Described herein is a coating system comprising: an applicator head that is configured to apply a coating to a surface of a workpiece; a shroud comprising a housing and an internal cavity located inside of the housing; and a humidifying apparatus comprising an output that is fluidly coupled to the shroud, wherein the humidifying apparatus configured to introduce a quantity of humid air to the internal cavity of the shroud.

Other embodiments of the present invention include a coating system comprising: an applicator head that is configured to apply a coating to a surface of a workpiece; a shroud comprising a housing and an internal cavity located inside of the housing; and a humidifying apparatus comprising an output that is fluidly coupled to the shroud, wherein the shroud can be altered between a first state and a second state, wherein in the first state the applicator head is at least partially located inside of the interval cavity and in the second state the applicator head is located outside of the internal cavity, and wherein in the first state the humidifying apparatus is configured to introduce a quantity of humid air to the internal cavity of the shroud that contacts the applicator head.

Other embodiments of the present invention include a coating system comprising: an applicator head that is configured to apply a coating to a surface of a workpiece; a shroud comprising: a housing; an internal cavity located inside of the housing; and a baffle located within the internal cavity; a humidifying apparatus comprising an output that is fluidly coupled to the shroud, wherein the humidifying apparatus is configured to introduce a quantity of humid air to the internal cavity of the shroud that contacts the applicator head.

Other embodiments of the present invention include a coating system comprising: an applicator head that is configured to apply a coating to a surface of a workpiece; a shroud comprising: a housing; and an internal cavity located inside of the housing; a humidifying apparatus comprising an output that is fluidly coupled to the shroud, the humidifying apparatus comprising: an air-moving device configured to move air; a steam generator configured to generate steam; a mixing apparatus comprising a mixing chamber configured to blend the steam with the air to form humid air; and wherein the humidifying apparatus is configured to introduce the humid air to the internal cavity of the shroud that contacts the applicator head.

Other embodiments of the present invention include a method for coating a workpiece, the method comprising: a) supplying humid air to a coating assembly, the coating assembly comprising: an applicator head; and a shroud comprising an internal cavity whereby the applicator head is at least partially disposed inside of the internal cavity and the humid air is supplied to the internal cavity of the coating assembly; b) moving the workpiece relative to the coating assembly; and c) directing a coating composition onto a surface of the workpiece using the applicator head and exposing the surface of the workpiece to the humid air.

Other embodiments of the present invention include a method for coating a workpiece, the method comprising: a) supplying humid air to a coating assembly, the coating assembly comprising: an applicator head; and a shroud comprising an internal cavity whereby the applicator head is at least partially disposed inside of the internal cavity and the humid air is supplied to the internal cavity of the coating assembly; b) moving the workpiece relative to the coating assembly; c) directing a coating composition onto a surface of the workpiece using the applicator head and exposing the surface of the workpiece to the humid air.

Other embodiments of the present invention include a method for coating a workpiece, the method comprising: a) supplying humid air to a coating assembly by a gravity feed, the coating assembly comprising: an applicator head comprising an applicator nozzle; and a shroud comprising an internal cavity and a baffle located inside of the internal cavity; whereby the applicator head is at least partially disposed inside of the internal cavity and the humid air is supplied to the internal cavity of the coating assembly; b) contacting the applicator head with the humid air as a coating composition is applied onto a surface of the workpiece using the applicator head, where by a condensation product of the humid air is directed away from the applicator nozzle by the baffle.

Other embodiments of the present invention include a shroud for coating a work piece, the shroud comprising a housing and an internal cavity located inside of the housing, the housing comprising: a top plate having an upper major surface opposite a lower major surface; a port located on the top plate and extending continuously from the upper major surface to the lower major surface of the top plate; a first side plate having a first major surface opposite a second major surface; the first side plate extending downward from the top plate; a second side plate having a first major surface opposite a second major surface; the second side plate extending downward from the top plate; a third side plate having a first major surface opposite a second major surface; the third side plate extending downward from the top plate; a baffle located within the internal cavity, wherein at least a portion of the baffle overlaps with the port in a vertical direction; and wherein each of the lower major surface of the top plate, the second major surface of the first side plate, the second major surface of the second side plate, and the second major surface of the third side plate face the internal cavity.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION

Figure 1:
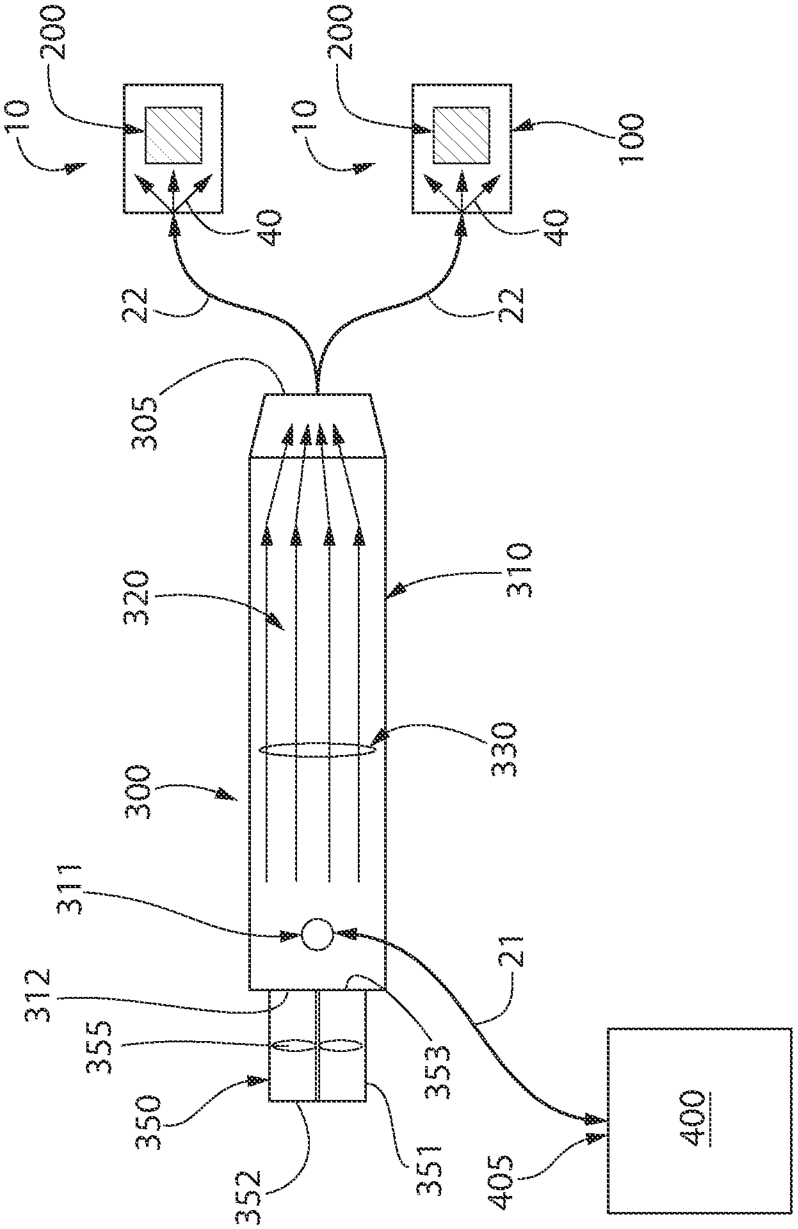
FIG. 1 is a flow diagram showing a coating system according to the present invention.
Figure 2:
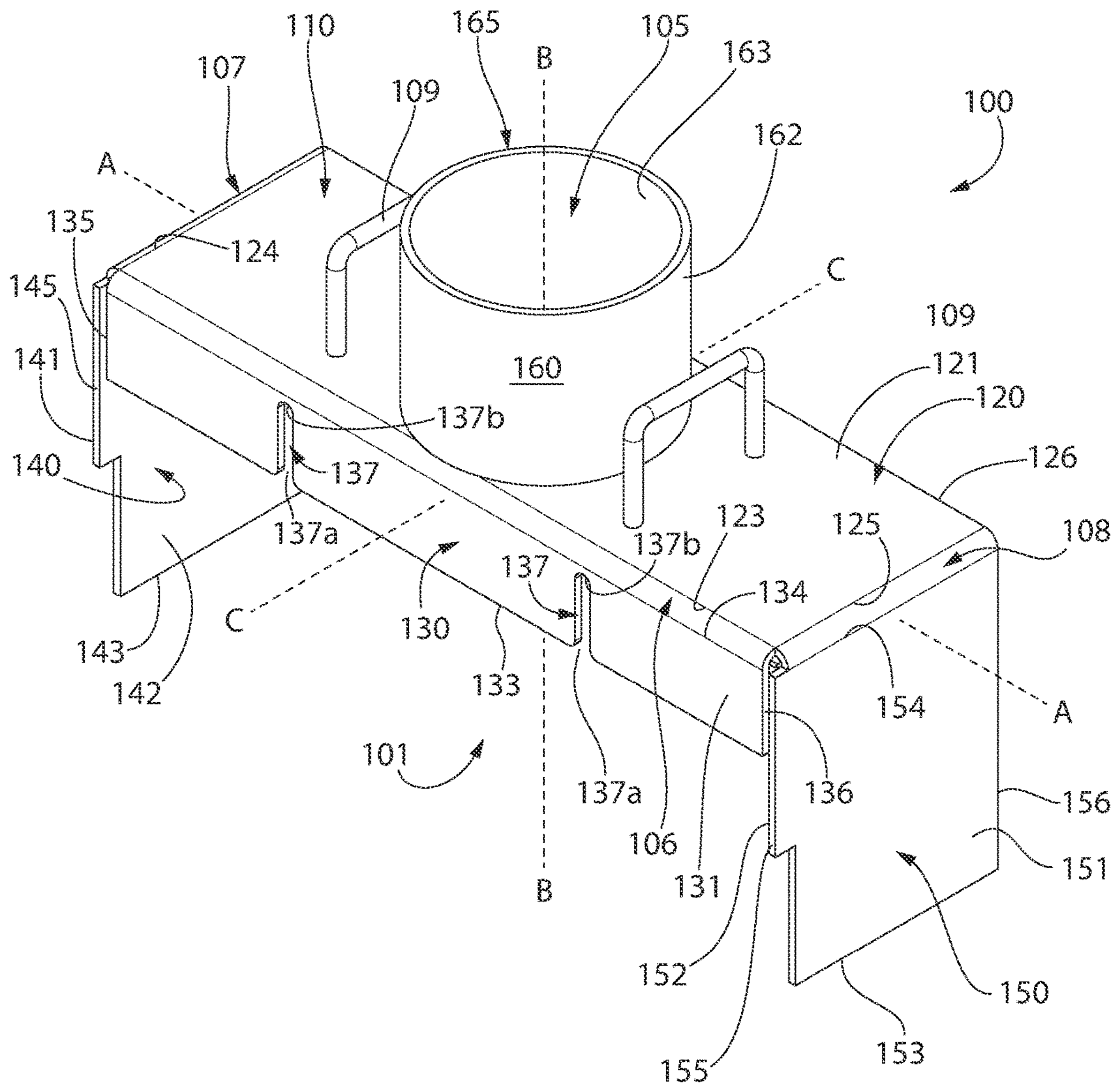
FIG. 2 is a top perspective view of a shroud according to the present invention.
Figure 3:
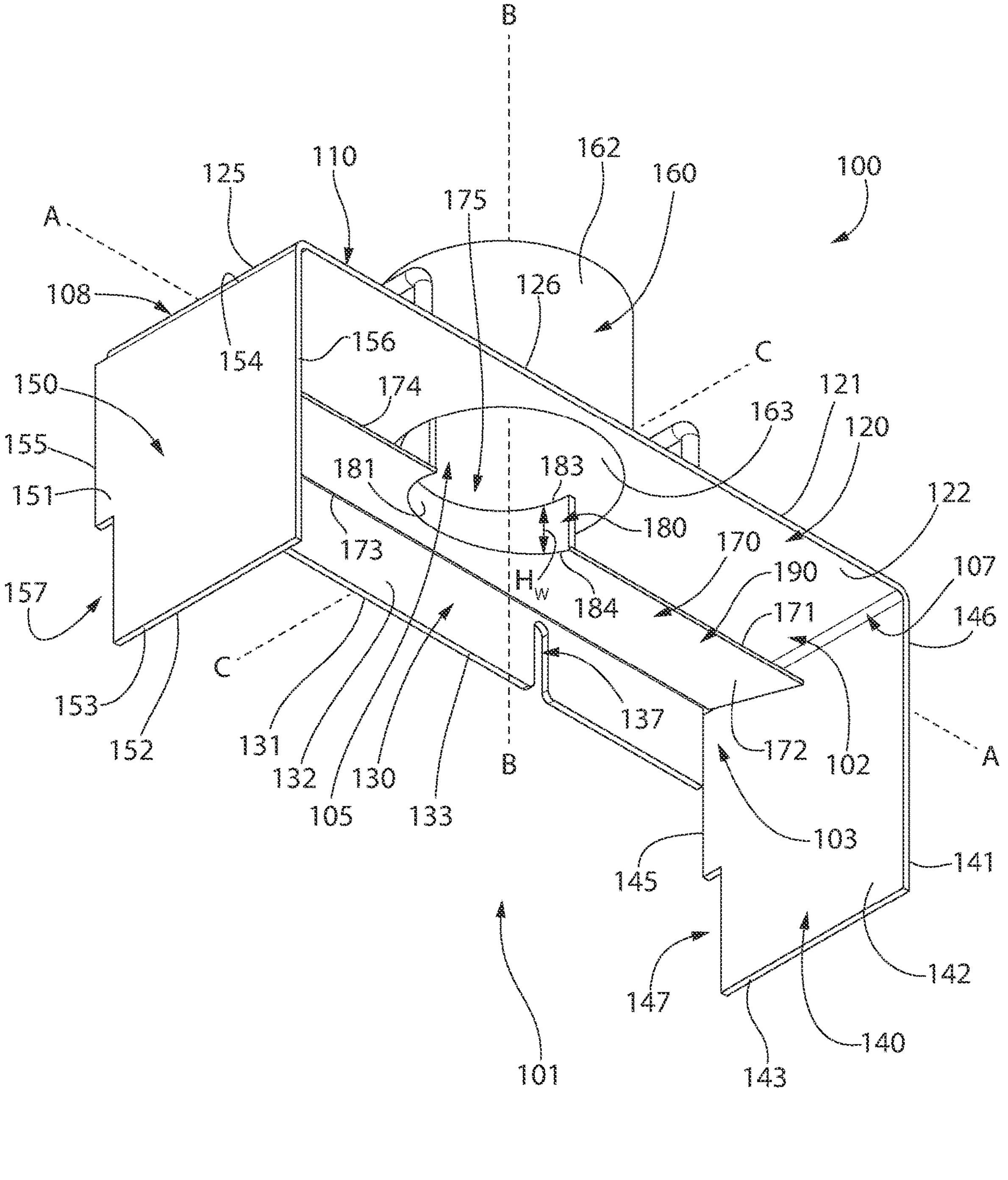
FIG. 3 is a bottom perspective view of the shroud of FIG. 2.
Figure 4:
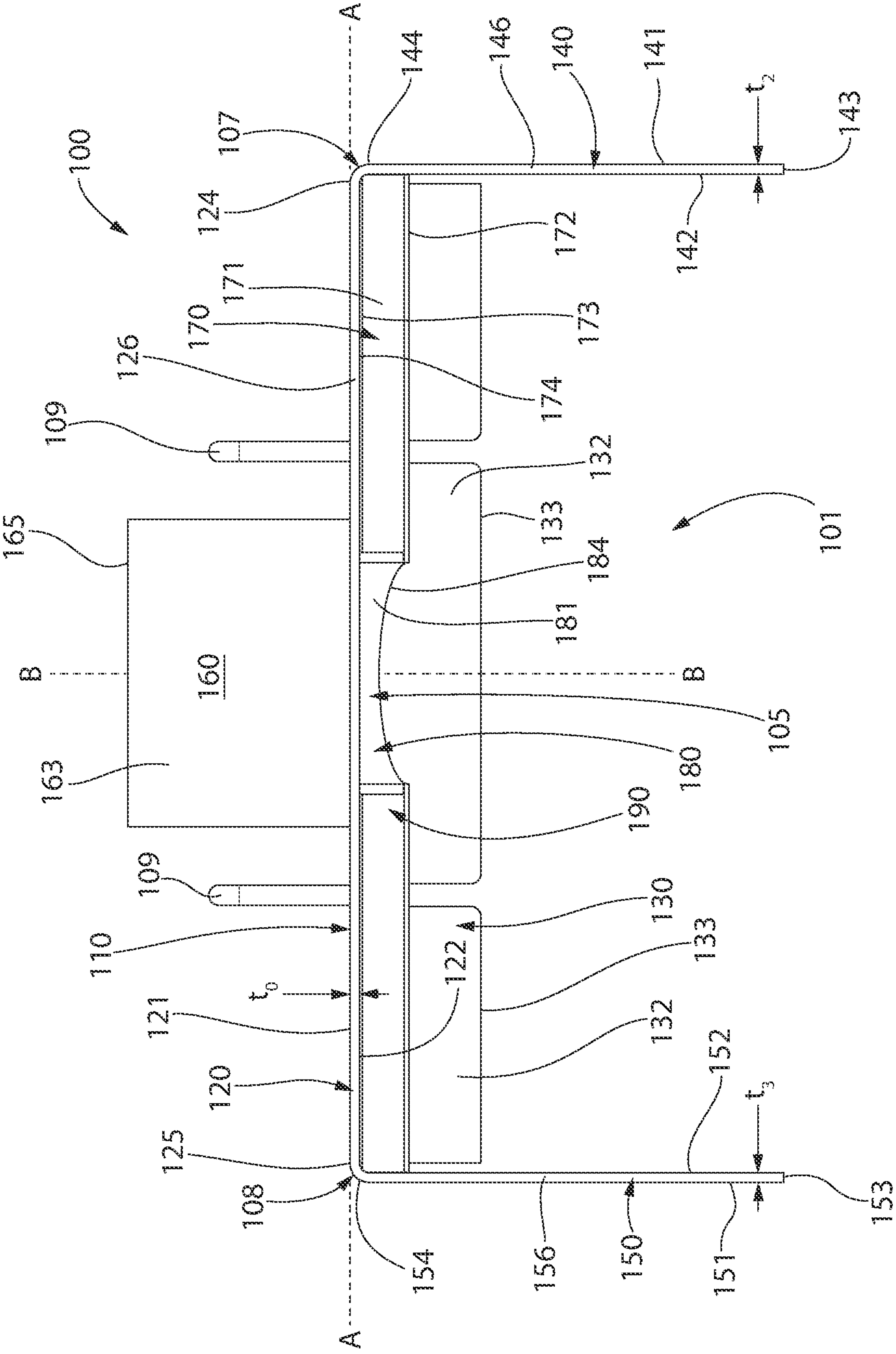
FIG. 4 is a rear view of the shroud of FIG. 2.
Figure 5:
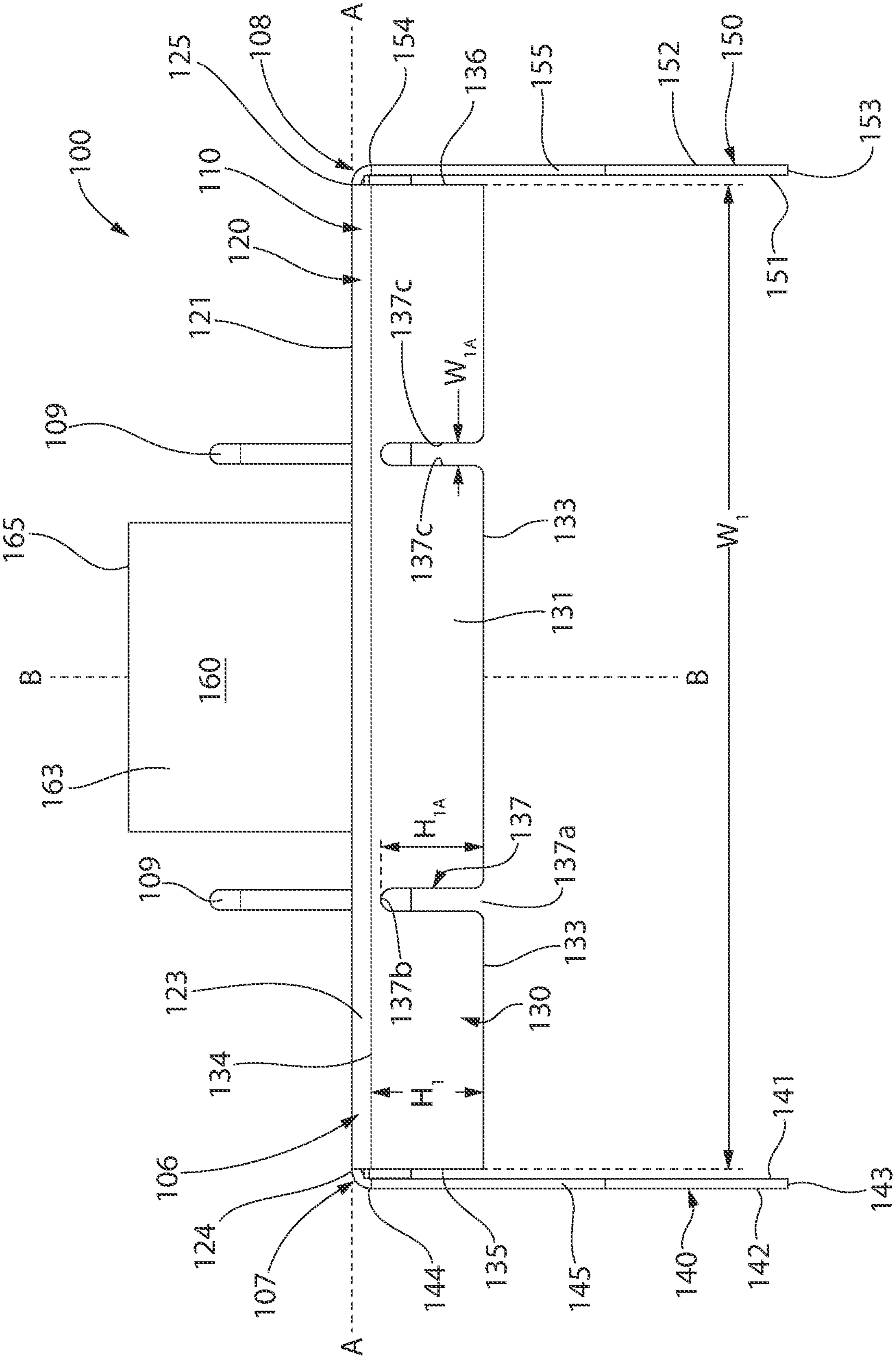
FIG. 5 is a front view of the shroud of FIG. 2.
Figure 6:
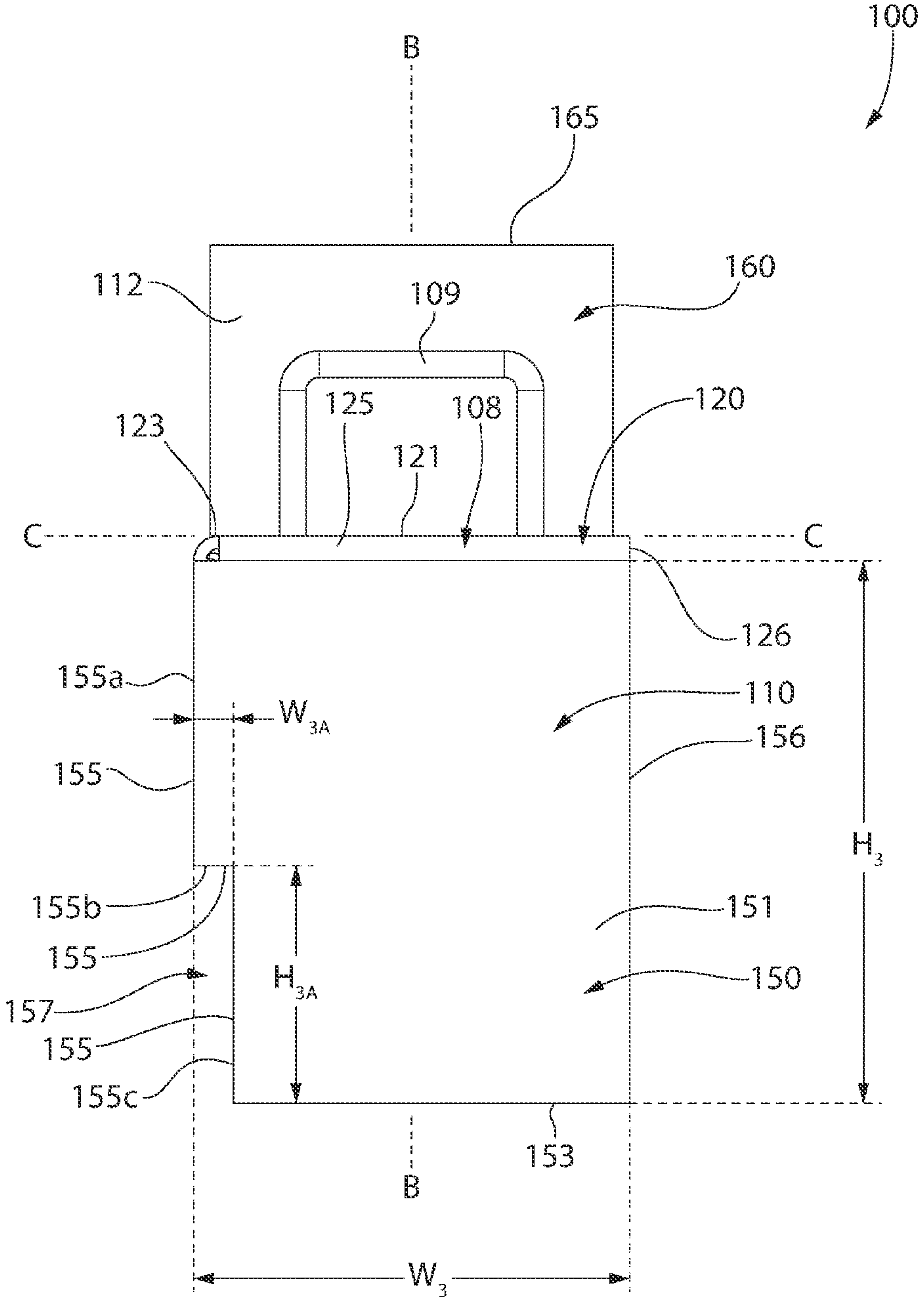
FIG. 6 is a right-side view of the shroud of FIG. 2.
Figure 7:
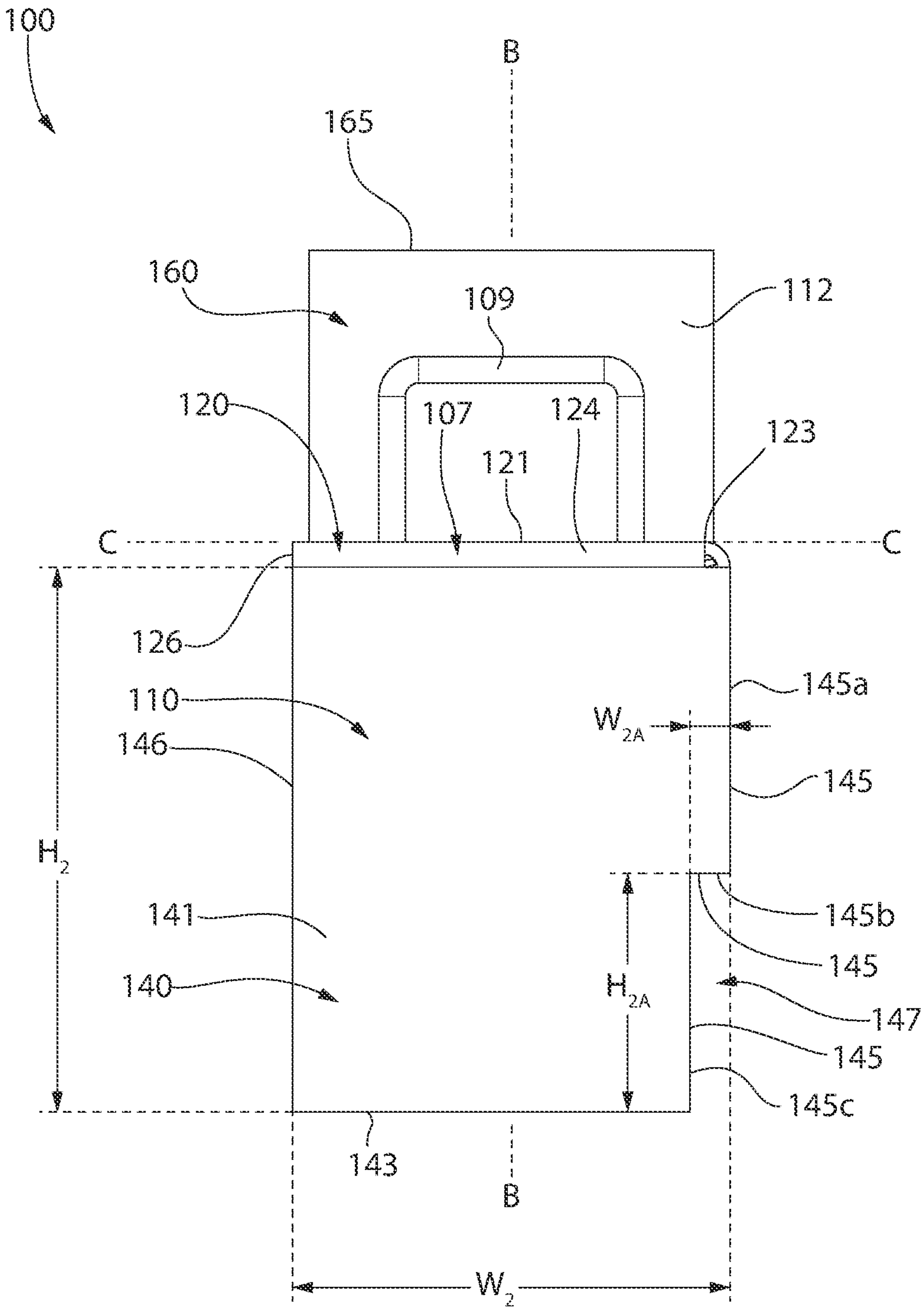
FIG. 7 is a left-side view of the shroud of FIG. 2.
Figure 8:
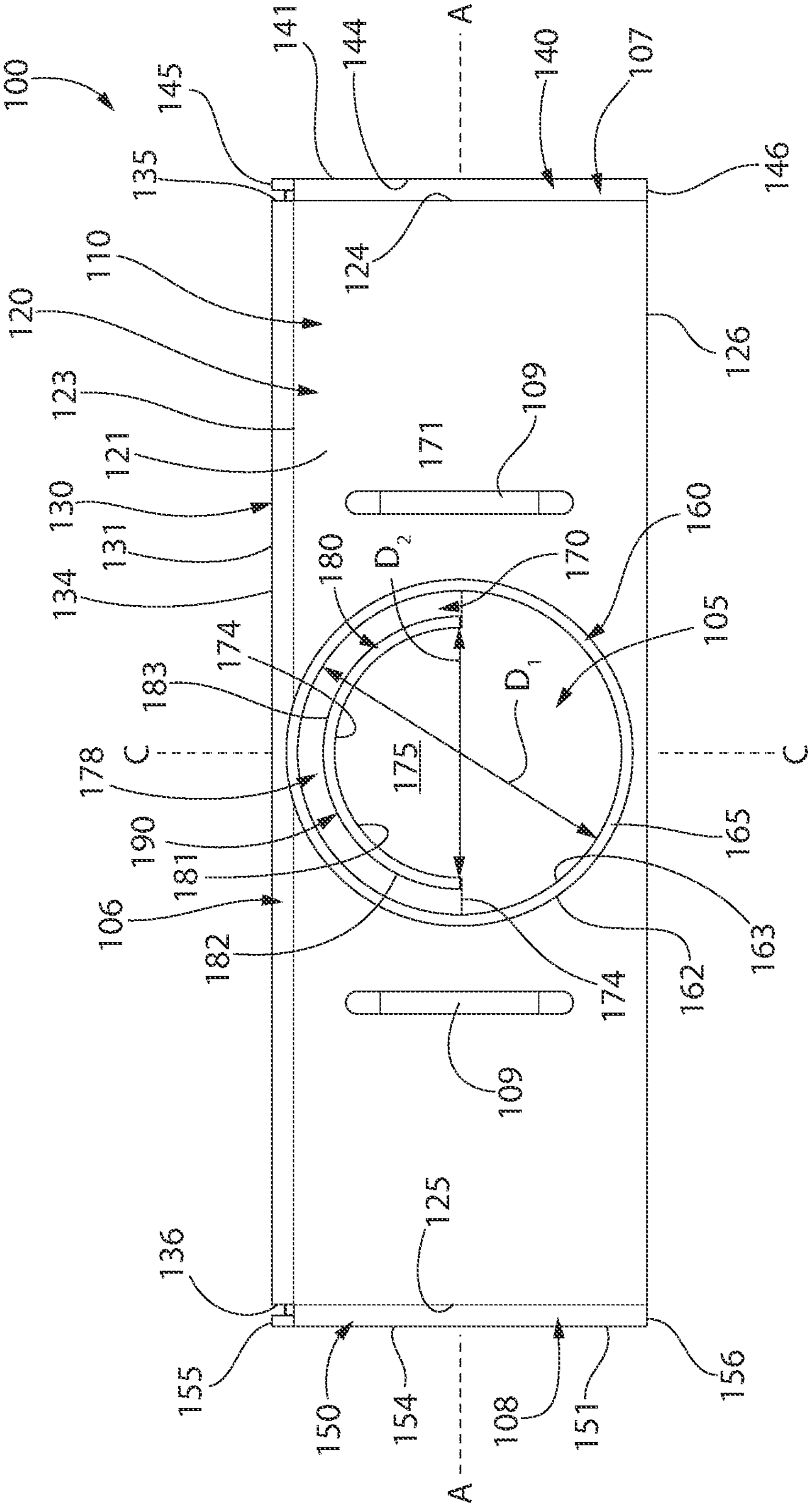
FIG. 8 is a top view of the shroud of FIG. 2.
Figure 9:
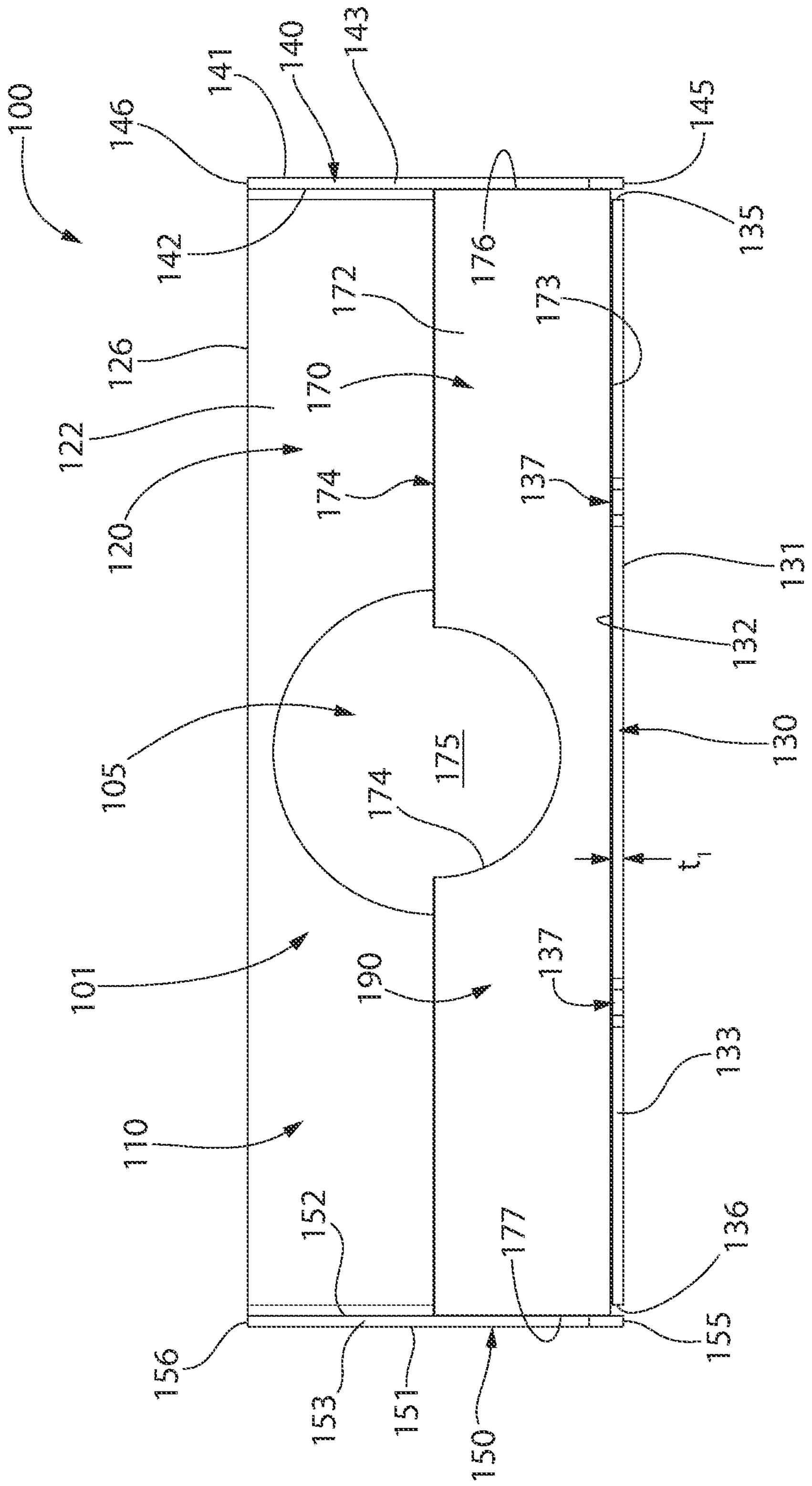
FIG. 9 is a bottom view of the shroud of FIG. 2.

The following description of the preferred embodiment(s) is merely exemplary in nature and is in no way intended to limit the invention, its application, or uses.

As used throughout, ranges are used as shorthand for describing each and every value that is within the range. Any value within the range can be selected as the terminus of the range. In addition, all references cited herein are hereby incorporated by referenced in their entireties. In the event of a conflict in a definition in the present disclosure and that of a cited reference, the present disclosure controls.

Unless otherwise specified, all percentages and amounts expressed herein and elsewhere in the specification should be understood to refer to percentages by weight. The amounts given are based on the active weight of the material.

The description of illustrative embodiments according to principles of the present invention is intended to be read in connection with the accompanying drawings, which are to be considered part of the entire written description. In the description of embodiments of the invention disclosed herein, any reference to direction or orientation is merely intended for convenience of description and is not intended in any way to limit the scope of the present invention. Relative terms such as "lower," "upper," "horizontal," "vertical," "above," "below," "up," "down," "top," and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation unless explicitly indicated as such.

Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise. Moreover, the features and benefits of the invention are illustrated by reference to the exemplified embodiments. Accordingly, the invention expressly should not be limited to such exemplary embodiments illustrating some possible non-limiting combination of features that may exist alone or in other combinations of features; the scope of the invention being defined by the claims appended hereto.

Unless otherwise specified, all percentages and amounts expressed herein and elsewhere in the specification should be understood to refer to percentages by weight. The amounts given are based on the active weight of the material. According to the present application, the term "about" means +/−5% of the reference value. According to the present application, the term "substantially free" less than about 0.1 wt. % based on the total of the referenced value.

Figure 10:
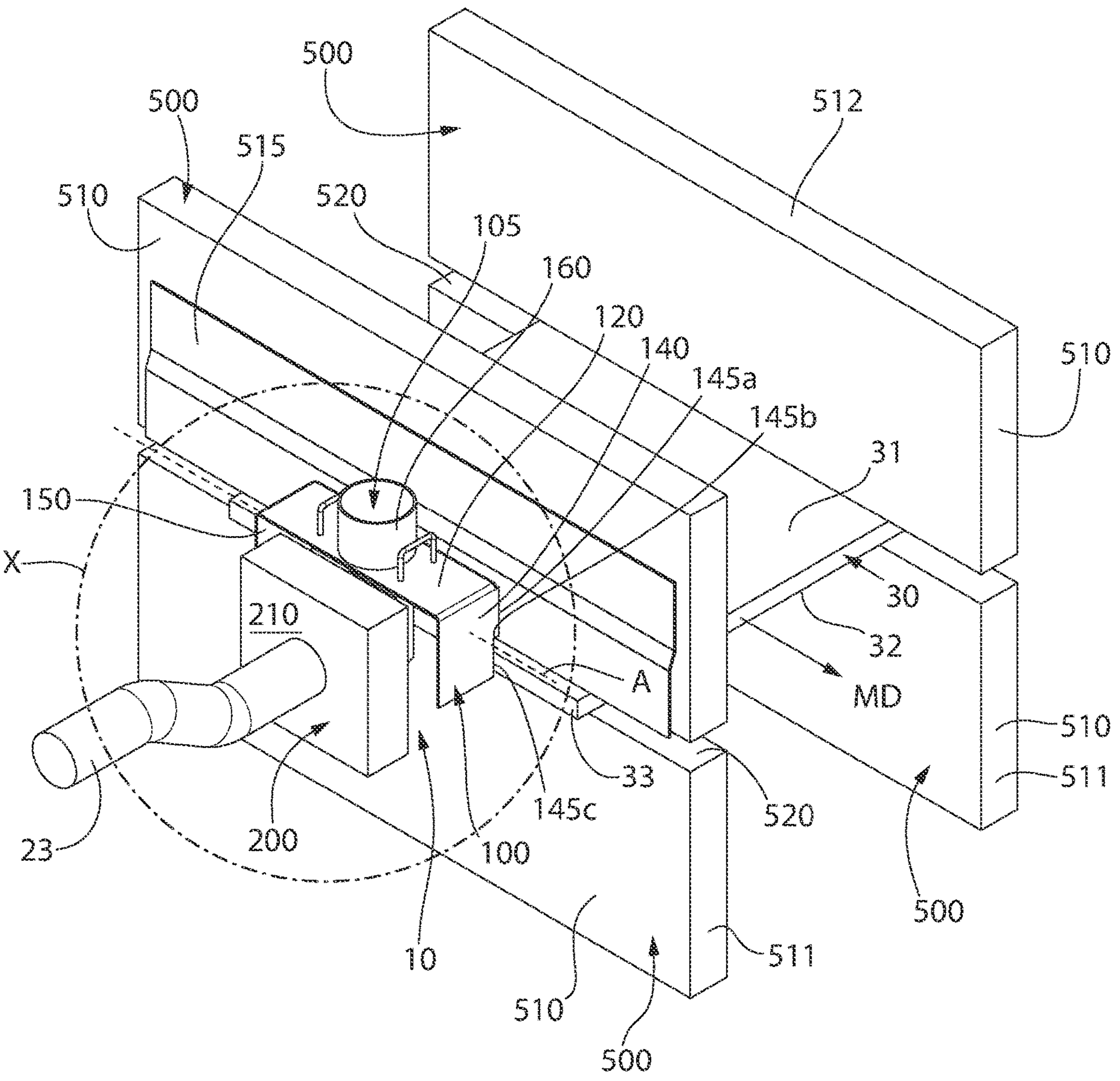
FIG. 10 is a perspective view of a portion of the coating system including a coating assembly, support apparatus, and a workpiece.
Figure 11:
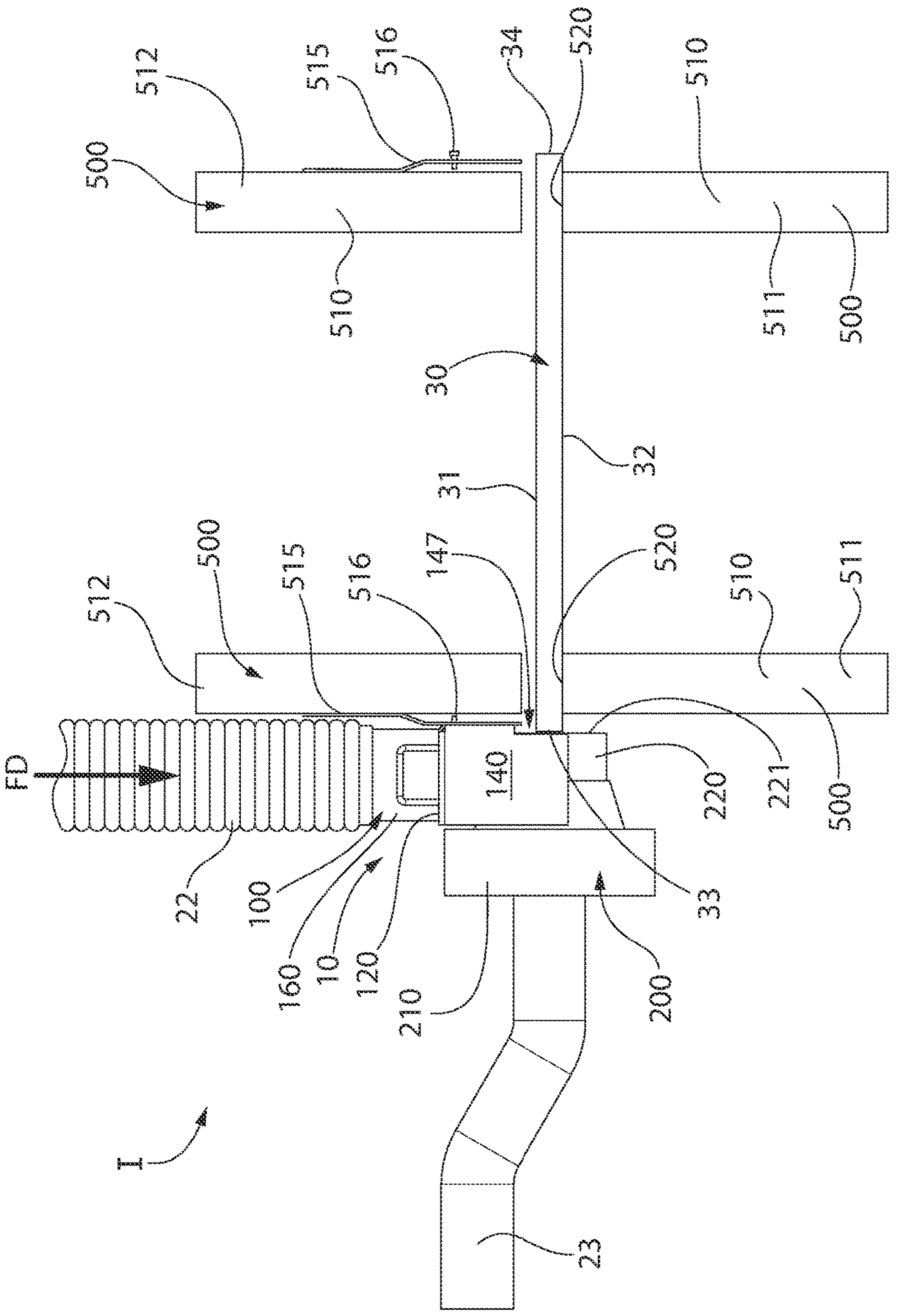
FIG. 11 is a side-view of the coating system of FIG. 10.

Referring to FIG. 1, the present invention is directed to a coating system 1 comprising a coating assembly 10, a humidifying apparatus 300, and a steam generating apparatus 400. The coating assembly 10 may comprise a shroud 100 and an applicator head 200. Referring to FIGS. 1, 10, and 11, the coating system 1 may further comprise comprising a support apparatus 500. The support apparatus 500 may comprise a frame 510 and a conveyor 520.

The steam generating apparatus 400 may comprises a reservoir and a heating element. The reservoir may be configured to store a quantity of liquid water, and the heating element may be configured to heat the liquid water inside of the reservoir thereby transitioning the water from liquid to vapor (also referred to as "water vapor"). The steam generating apparatus 400 may be further configured to modify the internal pressure of the reservoir to affect the generation of water vapor. The water vapor may be pure water vapor. The term "pure water vapor" refers to a volume or quantity of water that is about 100% in the gaseous phase.

The steam generating apparatus 400 may comprise a first output 405 that is fluidly coupled to the reservoir such that the water vapor may exit the steam generating apparatus 400 via the first output 405. The first output 405 of the steam generating apparatus 400 may be fluidly coupled to the humidifying apparatus 300 by a first supply line 21. The first supply line 21 may be directly coupled to the first output 405 of the steam generating apparatus 400. The first supply line 21 may be a pipe. Non-limiting examples of the first supply line 21 include insulated copper pipe. In other embodiments, an ultrasound element may generate humid air.

The humidifying apparatus 300 may comprise a mixing device 310 and an air-moving device 350. The mixing device 310 may comprise a mixing chamber 320 that is an elongated cavity within the mixing device 310. The mixing device 310 may comprise a first input 311. The mixing device 310 may further comprise a second input 312. The first output 405 of the steam generating apparatus 400 may be fluidly coupled to the first input 311 of the mixing device 310. The water vapor generated by the steam generating apparatus 400 may be delivered to the mixing chamber 320 of the mixing device 310 via the first supply line 21 and the first input 311 of the mixing device 310. The mixing chamber 320 of the mixing device 310 may be fluidly coupled to the output 405 of the steam generating apparatus 400 via the first supply line 21 and the first input 311 of the mixing device 310.

The air-moving device 350 may comprise a housing 351 and an air-moving element 355 that is configured to move air into the mixing chamber 320 of the mixing device 310. In a non-limiting embodiment, the air-moving element 355 may be a fan. The air-moving device 350 may comprise an input 352 and an output 353. The air-moving element 355 may be configured to pull air from the surrounding environment that is up-stream from the air-moving element 355 and through the input 352, whereby the air is subsequently pushed through the output 353 of the air-moving device 350 when down-stream from the air-moving element 355. Each of the input 352 and the output 353 of the air-moving device 350 may be located on the housing 351—whereby the air-moving element 355 is located inside of the housing 351.

The output 353 of the air-moving device 350 may be fluidly coupled to the second input 312 of the mixing device 310. The air moved by the air-moving element 355 may be delivered to the mixing chamber 320 of the mixing device 310 via the output 353 of the air-moving device 350 and the second input 312 of the mixing device 310. The mixing chamber 320 of the mixing device 310 may be fluidly coupled to input 352 of the air-moving device 350 via the output 353 of air-moving device 350 and the second input 312 of the mixing device 310.

The steam generating apparatus 400 may deliver water vapor to the humidifying apparatus 300 at a rate ranging from about 6 lb./hr. to about 16 lb./hr.—including all sub-ranges and specific rates there-between. In a non-limiting embodiment, the steam generating apparatus 400 may deliver water vapor to the humidifying apparatus 300 at a rate ranging from about 7 lb./hr. to about 15 lb./hr.—including all sub-ranges and specific rates there-between. In a non-limiting embodiment, the steam generating apparatus 400 may deliver water vapor to the humidifying apparatus 300 at a rate ranging from about 8 lb./hr. to about 14 lb./hr.—including all sub-ranges and specific rates there-between. In a non-limiting embodiment, the steam generating apparatus 400 may deliver water vapor to the humidifying apparatus 300 at a rate ranging from about 9 lb./hr. to about 13 lb./hr.—including all sub-ranges and specific rates there-between.

The air-moving device 350 may deliver air to the mixing chamber 320 at a rate ranging from about 500 CFM to about 700 CFM—including all sub-ranges and specific rates there-between. In a non-limiting embodiment, the air-moving device 350 may deliver air to the mixing chamber 320 at a rate ranging from about 525 CFM to about 675 CFM—including all sub-ranges and specific rates there-between. In a non-limiting embodiment, the air-moving device 350 may deliver air to the mixing chamber 320 at a rate ranging from about 550 CFM to about 650 CFM—including all sub-ranges and specific rates there-between. In a non-limiting embodiment, the air-moving device 350 may deliver air to the mixing chamber 320 at a rate ranging from about 575 CFM to about 625 CFM—including all sub-ranges and specific rates there-between. In a non-limiting embodiment, the air-moving device 350 may deliver air to the mixing chamber 320 at a rate ranging of about 600 CFM.

The air delivered to the mixing chamber 320 via the air-moving device 350 and the water vapor delivered to the mixing chamber 320 via the steam generator device may be blended together to form humid air 40. The mixing device 310 may comprise a static mixing element 330 located inside of the mixing chamber 320 to promote mixing of the water vapor and air.

The humid air 40 exiting the humidifying apparatus 300 may have a relative humidity ranging from about 60% to about 100%—including all relative humidity and sub-ranges there-between—as measured under normal atmospheric conditions. In some embodiments, the humid air 40 exiting the humidifying apparatus 300 may have a relative humidity ranging from about 60% to about 90%—including all relative humidity and sub-ranges there-between—as measured under normal atmospheric conditions.

The humidifying apparatus 300 may comprise an output 305 that is fluidly coupled to the mixing chamber 320 such that the humid air 40 generated inside of the mixing chamber 320 may exit the humidifying apparatus 300 at the output 305. The output 305 of the humidifying apparatus 300 may comprise a y-joint that separates the humid air stream into a first stream and a second stream.

The humidifying apparatus 300 may be fluidly coupled to one or more coating assembly 10 by one or more second supply lines 22. The second supply line 22 may be directly coupled to the second output 305 of the humidifying apparatus 300 and directly coupled to the one or more coating assembly 10. The second supply line 22 may be a conduit. Non-limiting examples of the second supply line 22 include a duct. The humid air 40 may be delivered from the humidifying apparatus 300 to the at least one coating assembly 10 via the one or more second supply lines 22.

The humidifying apparatus 300 may deliver humid air 40 to the one or more coating assembly 10 at a rate ranging from about 100 CFM to about 160 CFM—including all sub-ranges and specific rates there-between. In a non-limiting embodiment, the humidifying apparatus 300 may deliver humid air to the one or more coating assembly 10 at a rate ranging from about 110 CFM to about 150 CFM—including all sub-ranges and specific rates there-between. In a non-limiting embodiment, the humidifying apparatus 300 may deliver humid air to the one or more coating assembly 10 at a rate ranging from about 120 CFM to about 140 CFM—including all sub-ranges and specific rates there-between. In a non-limiting embodiment, the humidifying apparatus 300 may deliver humid air to the one or more coating assembly 10 at a rate of about 130 CFM.

The humidifying apparatus 300, the one or more coating assembly 10, and the one or more second supply lines 22 may be configured such that the humid air 40 reaches the one or more coating assembly 10 via gravity feed through the one or more second supply lines 22.

The humid air 40 that enters the coating assembly 10 may have a relative humidity ranging from about 20% to about 90%—including all relative humidity and sub-ranges there-between—as measured under normal atmospheric conditions. The change in relative humidity between the state at which the humid air exits the humidifying apparatus 300 and the state at which the humid air enters the coating assembly 10 may be due to condensation. In some embodiments, the humid air 40 that enters the coating assembly 10 may have a relative humidity ranging from about 20% to about 50%—including all relative humidity and sub-ranges there-between—as measured under normal atmospheric conditions. In some embodiments, the humid air 40 that enters the coating assembly 10 may have a relative humidity ranging from about 60% to about 90%—including all relative humidity and sub-ranges there-between—as measured under normal atmospheric conditions.

The humid air 40 when it enters the internal cavity 101 may have a temperature ranging from about 70° F. to about 120° F.—including all temperatures and sub-ranges there-between. The humid air 40 when it enters the internal cavity 101 may have a temperature ranging from about 80° F. to about 110° F.—including all temperatures and sub-ranges there-between. The humid air 40 when it enters the internal cavity 101 may have a temperature ranging from about 85° F. to about 105° F.—including all temperatures and sub-ranges there-between.

The humid air 40 when it enters the internal cavity 101 may have a temperature ranging from about 70° F. to about 120° F.—including all temperatures and sub-ranges there-between. The humid air 40 when it enters the internal cavity 101 may have a temperature ranging from about 80° F. to about 110° F.—including all temperatures and sub-ranges there-between. The humid air 40 when it enters the internal cavity 101 may have a temperature ranging from about 85° F. to about 105° F.—including all temperatures and sub-ranges there-between.

Referring now to FIGS. 2-11, the coating assembly 10 may comprise a shroud 100 and an applicator head 200. The shroud 100 comprises a housing 110 and an internal cavity 101 located inside of the housing 110. The housing 110 may include a top plate 120 and a first side plate 130 extending downward from the top plate 120. The housing 110 may include a second side plate 140 extending downward from the top plate 120. The housing 110 may include a third side plate 150 extending downward from the top plate 120.

The top plate 120 may be elongated. The top plate 120 may comprise an upper major surface 121 that is opposite a lower major surface 122. The top plate 120 may comprise a first edge 123 that is opposite a fourth edge 126 and a second edge 124 that is opposite a third edge 125. The first edge 123 and the fourth edge 126 may be substantially parallel. The first edge 123 and the fourth edge 126 may form longitudinal edges of the elongated top plate 120. The second edge 124 and the third edge 125 may be substantially parallel. The second edge 124 and the third edge 125 may form lateral edges of the elongated top plate 120. The first edge 123 and fourth edge 126 may intersect the second edge 124 and the third edge 125. The first edge 123 and fourth edge 126 may be substantially orthogonal to the second edge 124 and the third edge 125.

The top plate 120 may have a plate thickness to as measured between the upper major surface 121 and the lower major surface 122. The plate thickness to of the top plate 120 may be substantially uniform. The plate thickness to may range from about 0.0239 inch (24 gauge) to about 0.1793 inch (7 gauge)—including all thicknesses and sub-ranges there-between.

The first side plate 130 may comprise a first major surface 131 that is opposite a second major surface 132. The first side plate 130 may comprise a first bottom edge 133 that is opposite a first top edge 134. The first side plate 130 may comprise a first bottom edge 133 that is opposite a first top edge 134. The first side plate 130 may comprise a first side edge 135 that is opposite a second side edge 136.

The first side edge 135 of the first side plate 130 may extend between the first top edge 134 of the first side plate 130 and the first bottom edge 133 of the first side plate 130. The first side edge 135 of the first side plate 130 may intersect the first top edge 134 of the first side plate 130 and the first bottom edge 133 of the first side plate 130. The second side edge 136 of the first side plate 130 may extend between the first top edge 134 of the first side plate 130 and the first bottom edge 133 of the first side plate 130. The second side edge 136 of the first side plate 130 may intersect the first top edge 134 of the first side plate 130 and the first bottom edge 133 of the first side plate 130.

The first bottom edge 133 of the first side plate 130 and the first top edge 134 of the first side plate 130 may be substantially parallel. The first side edge 135 of the first side plate 130 and the second side edge 136 of the first side plate 130 may be substantially parallel. The first bottom edge 133 of the first side plate 130 and the first top edge 134 of the first side plate 130 may be substantially orthogonal to each of the first side edge 135 of the first side plate 130 and the second side edge 136 of the first side plate 130.

The first side plate 130 may extend downward from the top plate 120 spanning from the first top edge 134 of the first side plate 130 to the first bottom edge 133 of the first side plate 130. The first side plate 130 may extend a first height $H_1$ as measured between the first top edge 134 of the first side plate 130 to the first bottom edge 133 of the first side plate 130. The first height $H_1$ may range from about 1.25 inches to about 2.0 inches—including all heights and sub-ranges there-between. In some embodiments, the first height $H_1$ may be about 1.625 inches.

The first side plate 130 may have a first width $W_1$ as measured between the first side edge 135 and the second side edge 136 of the first side plate 130. The first width $W_1$ may range from about 12 inches to about 13 inches—including all widths and sub-ranges there-between.

The first side plate 130 may have a first thickness $t_1$ as measured between the first major surface 131 and the second major surface 132 of the first side plate 130. The first thickness $t_1$ of the first side plate 130 may be substantially uniform. The first thickness $t_1$ may range from about 0.0239 inch (24 gauge) to about 0.1793 inch (7 gauge)—including all thicknesses and sub-ranges there-between. The first thickness $t_1$ of the first side plate 130 may be substantially equal to the plate thickness to of the top plate 120.

The first side plate 130 may comprise a first securing element 137. The first securing element 137 may extend from the first major surface 131 to the second major surface 132 of the first side plate 130. In the embodiment shown in FIGS. 2-5, the first securing element 137 may be an open-ended slot comprising an opening **137*a* that is opposite a slot ceiling 137*b*, whereby slot walls 137*c* extend between the opening 137*a* and the slot ceiling 137*b***.

The slot ceiling **137*b* and the opening 137*a* may be spaced apart by a first offset height $H_{1A}$ (also referred to as "slot depth"). The first offset height $H_{1A}$ of the vertical slot 137 may range from about 1.0 inch to about 1.5 inches—including all heights and sub-ranges there-between—provided that the first offset height $H_{1A}$ is less than the first height $H_1$. The slot walls 137*c*** may include two parallel walls that are offset from each other by a first offset width $W_{1A}$ (also referred to as "slot width"). In a non-limiting embodiment, the first offset width $W_{1A}$ may range from about ⅛ inch to about ½ inch—including all distances and sub-ranges there-between.

A ratio of the first height $H_1$ of the first side plate 130 and the first offset height $H_{1A}$ of the vertical slot 137 may range from about 1.1:1.0 to about 1.4:1.0—including all distances and sub-ranges there-between. A ratio of the first offset height $H_{1A}$ of the vertical slot 137 and the first offset width $W_{1A}$ of the vertical slot 137 may range from about 2:1 to about 12:1—including all ratios and sub-ranges there-between.

The first edge 123 of the top plate 120 may transition into the first top edge 134 of the first side plate 130. The first edge 123 of the top plate 120 may directly transition into the first top edge 134 of the first side plate 130. The first edge 123 of the top plate 120 may seamlessly transition into the first top edge 134 of the first side plate 130. The first edge 123 of the top plate 120 may transition into the first top edge 134 of the first side plate 130 at a first bend 106 comprising the first edge 123 of the top plate 120 and the first top edge 134 of the first side plate 130.

The second side plate 140 may comprise a first major surface 141 that is opposite a second major surface 142. The second side plate 140 may comprise a second bottom edge 143 that is opposite a second top edge 144. The second side plate 140 may comprise a first side edge 145 that is opposite a second side edge 146.

The first side edge 145 of the second side plate 140 may extend between the second top edge 144 of the second side plate 140 and the second bottom edge 143 of the second side plate 140. The second side edge 146 of the second side plate 140 may extend between the second top edge 144 of the second side plate 140 and the second bottom edge 143 of the second side plate 140. The first side edge 145 of the second side plate 140 may intersect the second top edge 144 of the second side plate 140 and the second bottom edge 143 of the second side plate 140. The second side edge 146 of the second side plate 140 may intersect the second top edge 144 of the second side plate 140 and the second bottom edge 143 of the second side plate 140.

The second bottom edge 143 of the second side plate 140 and the second top edge 144 of the second side plate 140 may be substantially parallel. The first side edge 145 of the second side plate 140 and the second side edge 146 of the second side plate 140 may be substantially parallel. The second bottom edge 143 of the second side plate 140 and the second top edge 144 of the second side plate 140 may be substantially orthogonal to each of the first side edge 145 of the second side plate 140 and the second side edge 146 of the second side plate 140.

The second side plate 140 may extend downward from the top plate 120 spanning from the second top edge 144 of the second side plate 140 to the second bottom edge 143 of the second side plate 140. The second side plate 140 may extend a second height $H_2$ as measured between the second top edge 144 of the second side plate 140 to the second bottom edge 143 of the second side plate 140. The second height $H_2$ may range from about 4.25 inches to about 6.25 inches—including all distances and sub-ranges there-between. In some embodiments, the second height $H_2$ may be about 5.25 inches.

The second side plate 140 may have a second width $W_2$ as measured between the first side edge 145 and the second side edge 146 of the second side plate 140. The second width $W_2$ may range from about 3 inches to about 5 inches—including all distances and sub-ranges there-between. In some embodiments, the second width $W_2$ may be about 4 inches.

The second side plate 140 may have a second thickness $t_2$ as measured between the first major surface 141 and the second major surface 142 of the second side plate 140. The second thickness $t_2$ of the second side plate 140 may be substantially uniform. The second thickness $t_2$ may range from about 0.0239 inch (24 gauge) to about 0.1793 inch (7 gauge)—including all thicknesses and sub-ranges there-between. The second thickness $t_2$ of the second side plate 140 may be substantially equal to each of the plate thickness to of the top plate 120 and/or the first thickness $t_1$ of the first side plate 130.

The first side edge 145 of the second side plate 140 may comprise a first portion **145*a*, a second portion 145*b*, and a third portion 145*c*. The first portion 145*a* of the first side edge 145 of the second side plate 140 may be an upper portion located adjacent to the second top edge 144 of the second side plate 140. The third portion 145*c* of the first side edge 145 of the second side plate 140 may be a lower portion located adjacent to the second bottom edge 143 the second side plate 140. The second portion 145*b* of the first side edge 145 of the second side plate 140 may be located between the first portion 145*a* and the third portion 145*c* of the first side edge 145 of the second side plate 140**.

The first portion **145*a* of the first side edge 145 of the second side plate 140 may extend vertically between the second top edge 144 of the second side plate 140 and the second portion 145*b* of the first side edge 145 of the second side plate 140. The second portion 145*b* of the first side edge 145 of the second side plate 140 may extend transverse to the first portion 145*a* of the first side edge 145 of the second side plate 140. The second portion 145*b* of the first side edge 145 of the second side plate 140 may extend horizontally between the first portion 145*a* and the third portion 145*c* of the first side edge 145 of the second side plate 140. The third portion 145*c* of the first side edge 145 of the second side plate 140 may extend vertically between the second portion 145*b* of the first side edge 145 of the second side plate 140 and the second bottom edge 143 of the second side plate 140**.

The first portion **145*a* of the first side edge 145 of the second side plate 140 and the third portion 145*c* of the first side edge 145 of the second side plate 140 may be substantially parallel. The second portion 145*b* of the first side edge 145 of the second side plate 140 and the third portion 145*c* of the first side edge 145 of the second side plate 140 may be substantially orthogonal. The second portion 145*b* of the first side edge 145 of the second side plate 140 and the first portion 145*a* of the first side edge 145 of the second side plate 140** may be substantially orthogonal.

The first portion **145*a* of the first side edge 145 of the second side plate 140 and the second side edge 146 of the second side plate 140 may be spaced apart by a distance that is substantially equal to the second width $W_2$ of the second side plate 140. The first portion 145*a* of the first side edge 145 of the second side plate 140 and the third portion 145*c* of the first side edge 145 of the second side plate 140** may be horizontally offset from each other by a second offset width $W_{2A}$—whereby the second offset width $W_{2A}$ ranges from about 0.125 inches to about 0.375—including all widths and sub-ranges there-between. In some embodiments, the second offset width $W_{2A}$ may be about 0.25 inches.

The third portion **145*c* of the first side edge 145 of the second side plate 140 and the second side edge 146 of the second side plate 140** may be spaced apart by a distance that is equal to the difference between the second width $W_2$ and the second offset width $W_{2A}$.

The second portion **145*b* of the first side edge 145 of the second side plate 140 and the second bottom edge 143 of the second side plate 140** may be vertically offset from each other by a second offset height $H_{2A}$—whereby the second offset height $H_{2A}$ ranges from about 1.75 inches to about 2.75 inches—including all distances and sub-ranges there-between. In some embodiments, the second offset height $H_{2A}$ may be about 2.25 inches.

The second portion 145_b_ of the first side edge 145 of the second side plate 140 and the second top edge 144 of the second side plate 140 may be spaced apart by a distance that is equal to the difference between the second height $H_2$ and the second offset height $H_{2A}$.

The combination of the second portion 145_b_ and third portion 145_c_ being inset from the first portion 145_a_ of the first side edge 145 creates a stepped edge profile 147 on the second side plate 140.

The stepped edge profile 147 of the second side plate 140 may have a stepped width ratio of the second width $W_2$ to the second offset width $W_{2A}$ ranging from about 12:1 to about 20:1—including all ratios and sub-ranges there-between. In some embodiments, the stepped width ratio of the second side plate 140 may range from about 14:1 to about 18:1—including all ratios and sub-ranges there-between. In some embodiments, the stepped width ratio of the second side plate 140 may be about 16:1.

The stepped edge profile 147 of the second side plate 140 may have a stepped height ratio of the second height $H_2$ to the second offset height $H_{2A}$ ranging from about 1.66:1 to about 3.33:1—including all ratios and sub-ranges there-between. In some embodiments, the stepped edge profile 147 of the second side plate 140 may have a stepped height ratio of the second height $H_2$ to the second offset height $H_{2A}$ ranging from about 2:1 to about 2.66:1—including all ratios and sub-ranges there-between. In some embodiments, the stepped height ratio of the second height $H_2$ to the second offset height $H_{2A}$ may be about 2.33:1.

The second edge 124 of the top plate 120 may transition into the second top edge 144 of the second side plate 140. The second edge 124 of the top plate 120 may directly transition into the second top edge 144 of the second side plate 140. The second edge 124 of the top plate 120 may seamlessly transition into the second top edge 144 of the second side plate 140. The second edge 124 of the top plate 120 may transition into the second top edge 144 of the second side plate 140 at a second bend 107 comprising the second edge 124 of the top plate 120 and the second top edge 144 of the second side plate 140.

The third side plate 150 may comprise a first major surface 151 that is opposite a second major surface 152. The third side plate 150 may comprise a third bottom edge 153 that is opposite a third top edge 154. The third side plate 150 may comprise a first side edge 155 that is opposite a second side edge 156.

The first side edge 155 of the third side plate 150 may extend between the third top edge 154 of the third side plate 150 and the third bottom edge 153 of the third side plate 150. The second side edge 156 of the third side plate 150 may extend between the third top edge 154 of the third side plate 150 and the third bottom edge 153 of the third side plate 150. The first side edge 155 of the third side plate 150 may intersect the third top edge 154 of the third side plate 150 and the third bottom edge 153 of the third side plate 150. The second side edge 156 of the third side plate 150 may intersect the third top edge 154 of the third side plate 150 and the third bottom edge 153 of the third side plate 150.

The third bottom edge 153 of the third side plate 150 and the third top edge 154 of the third side plate 140 may be substantially parallel. The first side edge 155 of the third side plate 150 and the second side edge 156 of the third side plate 140 may be substantially parallel. The third bottom edge 153 of the third side plate 150 and the third top edge 154 of the third side plate 150 may be substantially orthogonal to each of the first side edge 155 of the third side plate 150 and the second side edge 156 of the third side plate 150.

The third side plate 150 may extend downward from the top plate 120 spanning from the third top edge 154 of the third side plate 150 to the third bottom edge 153 of the third side plate 150. The third side plate 150 may extend a third height $H_3$ as measured between the third top edge 154 of the third side plate 150 to the third bottom edge 153 of the third side plate 150. The third height $H_3$ may range from about 4.25 inches to about 6.25 inches—including all distances and sub-ranges there-between. In some embodiments, the third height $H_3$ may be about 5.25 inches.

The third side plate 150 may have a third width $W_3$ as measured between the first side edge 155 and the second side edge 146 of the third side plate 150. The third width $W_3$ may range from about 3 inches to about 5 inches—including all distances and sub-ranges there-between. In some embodiments, the third width $W_3$ may be about 4 inches.

The third side plate 150 may have a third thickness $t_3$ as measured between the first major surface 151 and the second major surface 152 of the third side plate 150. The third thickness $t_3$ of the third side plate 150 may be substantially uniform. The third thickness $t_3$ may range from about 0.0239 inch (24 gauge) to about 0.1793 inch (7 gauge)—including all thicknesses and sub-ranges there-between. The third thickness $t_3$ of the third side plate 150 may be substantially equal to each of the plate thickness to of the top plate 120 and/or the first thickness $t_1$ of the first side plate 130 and/or the second thickness $t_2$ of the second side plate 140.

The first side edge 155 of the third side plate 150 may comprise a first portion 155_a_, a second portion 155_b_, and a third portion 155_c_. The first portion 155_a_ of the first side edge 155 of the third side plate 150 may be an upper portion located adjacent to the third top edge 154 of the third side plate 150. The third portion 155_c_ of the first side edge 155 of the third side plate 150 may be a lower portion located adjacent to the third bottom edge 153 the third side plate 150. The second portion 155_b_ of the first side edge 155 of the third side plate 150 may be located between the first portion 155_a_ and the third portion 155_c_ of the first side edge 155 of the third side plate 150.

The first portion 155_a_ of the first side edge 155 of the third side plate 150 may extend vertically between the third top edge 154 of the third side plate 150 and the second portion 155_b_ of the first side edge 155 of the third side plate 150. The second portion 155_b_ of the first side edge 155 of the third side plate 150 may extend transverse to the first portion 155_a_ of the first side edge 155 of the third side plate 150. The second portion 155_b_ of the first side edge 155 of the third side plate 150 may extend horizontally between the first portion 155_a_ and the third portion 155_c_ of the first side edge 155 of the third side plate 150. The third portion 155_c_ of the first side edge 155 of the third side plate 150 may extend vertically between the second portion 155_b_ of the first side edge 155 of the third side plate 150 and the third bottom edge 153 of the third side plate 150.

The first portion 155_a_ of the first side edge 155 of the third side plate 150 and the third portion 155_c_ of the first side edge 155 of the third side plate 150 may be substantially parallel. The second portion 155_b_ of the first side edge 155 of the third side plate 150 and the third portion 155_c_ of the first side edge 155 of the third side plate 150 may be substantially orthogonal. The second portion 155_b_ of the first side edge 155 of the third side plate 150 and the first portion 155_a_ of the first side edge 155 of the third side plate 150 may be substantially orthogonal.

The first portion 155_a_ of the first side edge 155 of the third side plate 150 and the second side edge 156 of the third side plate 150 may be spaced apart by a distance that is substantially equal to the third width $W_3$ of the third side plate 150. The first portion 155*a* of the first side edge 155 of the third side plate 150 and the third portion 155*c* of the first side edge 155 of the third side plate 150 may be horizontally offset from each other by a third offset width $W_{3A}$—whereby the third offset width $W_{3A}$ ranges from about 0.125 inches to about 0.375—including all widths and sub-ranges there-between. In some embodiments, the third offset width $W_{3A}$ may be about 0.25 inches.

The third portion 155*c* of the first side edge 155 of the third side plate 150 and the second side edge 156 of the third side plate 150 may be spaced apart by a distance that is equal to the difference between the third width $W_3$ and the third offset width $W_{3A}$.

A ratio between the third width $W_3$ and the second offset width $W_{3A}$ may range from about 12:1 to about 20:1—including all ratios and sub-ranges there-between. In some embodiments, the ratio between the third width $W_3$ and the third offset width $W_{3A}$ may range from about 14:1 to about 18:1—including all ratios and sub-ranges there-between. In some embodiments, the ratio between the third width $W_3$ and the second offset width $W_{3A}$ may be about 16:1.

The second portion 155*b* of the first side edge 155 of the third side plate 150 and the third bottom edge 153 of the third side plate 150 may be vertically offset from each other by a third offset height $H_{3A}$—whereby the third offset height $H_{3A}$ ranges from about 1.75 inches to about 2.75 inches—including all distances and sub-ranges there-between. In some embodiments, the third offset height $H_{3A}$ may be about 2.25 inches.

The second portion 155*b* of the first side edge 155 of the third side plate 150 and the third top edge 154 of the third side plate 150 may be spaced apart by a distance that is equal to the difference between the third height $H_3$ and the third offset height $H_{3A}$.

The combination of the second portion 155*b* and third portion 155*c* being inset from the first portion 155*a* of the first side edge 155 creates a stepped edge profile 157 on the third side plate 150.

The stepped edge profile 157 of the third side plate 150 may have a stepped width ratio of the third width $W_3$ to the third offset width $W_{3A}$ ranging from about 12:1 to about 20:1—including all ratios and sub-ranges there-between. In some embodiments, the stepped width ratio of the third side plate 150 may range from about 14:1 to about 18:1—including all ratios and sub-ranges there-between. In some embodiments, the stepped width ratio of the third side plate 150 may be about 16:1.

The stepped edge profile 157 of the third side plate 150 may have a stepped height ratio of the third height $H_3$ to the third offset height $H_{3A}$ ranging from about 1.66:1 to about 3.33:1—including all ratios and sub-ranges there-between. In some embodiments, the stepped edge profile 157 of the third side plate 150 ranging from about 2:1 to about 2.66:1—including all ratios and sub-ranges there-between. In some embodiments, the stepped height ratio of the third side p[late 150 may be about 2.33:1.

The third edge 125 of the top plate 120 may transition into the third top edge 154 of the third side plate 150. The third edge 125 of the top plate 120 may directly transition into the third top edge 154 of the third side plate 150. The third edge 125 of the top plate 120 may seamlessly transition into the third top edge 154 of the third side plate 150. The third edge 125 of the top plate 120 may transition into the third top edge 154 of the third side plate 150 at a third bend 108 comprising the third edge 125 of the top plate 120 and the third top edge 154 of the third side plate 150.

The steeped edge profile 157 of the third side plate 150 may mirror the stepped edge profile 147 of the second side plate 140.

In some embodiments, the second width $W_2$ and the third width $W_3$ may be substantially equal. In some embodiments, the second offset width $W_{2A}$ and the third offset width $W_{3A}$ may be substantially equal. In some embodiments the stepped width ratio of the second side plate 140 may be substantially equal to the stepped width ratio of the third side plate 150.

In some embodiments, the second height $H_2$ and the third height $H_3$ may be substantially equal. In some embodiments, the second offset height $H_{2A}$ and the third offset height $H_{3A}$ may be substantially equal. In some embodiments the stepped height ratio of the second side plate 140 may be substantially equal to the stepped height ratio of the third side plate 150. The second height $H_2$ may be greater than the first height $H_1$. The third height $H_3$ may be greater than the first height $H_1$.

Collectively, the lower major surface 122 of the top plate 120, the second major surface 132 of the first side plate 130, the second major surface 142 of the second side plate 140, and the second major surface 152 of the third side plate 150 may face inward towards the internal cavity 101. Stated otherwise, the internal cavity 101 may be defined by the lower major surface 122 of the top plate 120, the second major surface 132 of the first side plate 130, the second major surface 142 of the second side plate 140, and the second major surface 152 of the third side plate 150. The internal cavity 101 may be open-ended towards the first bottom edge 133 of the first side plate 130, the second bottom edge 143 of the second side plate 140, and the third bottom edge 153 of the third side plate 150. As discussed further herein, the open-ended internal cavity 101 may be configured to receive the applicator head 200.

The top plate 120 may comprise a port 105. The port 105 may be an opening having an opening diameter $D_1$ that is centered about an opening axis B-B that extends in a direction between the upper major surface 121 and the lower major surface 122 of the top plate 120. The opening diameter $D_1$ may range from about 2 inches to about 4 inches—including all diameters and subranges there-between. In some embodiments, the opening diameter $D_1$ may be about 3.56 inches.

The opening may extend continuously from the upper major surface 121 to the lower major surface 122 of the top plate. The port 105 may provide a fluid pathway from external the shroud 100 to inside the internal cavity 101.

The housing 110 of the shroud 100 may further comprise an attachment element 160 located atop the upper major surface 121 of the top plate 120. The attachment element 160 may be centered about opening axis B-B. In a non-limiting embodiment, the attachment element 160 may have an open ended tube having a first open end 165 opposite a second open end 166 and a tube wall 161 extending between the first and second open ends 165, 166. The tube wall 161 may comprise an outer surface 162 opposite an inner surface 163.

According to the embodiments where the open ended tube has a circular cross-sectional shape, the tube wall 161 may be a cylindrical wall having an inner surface 163 that defines an inner diameter of the attachment element 160 and the outer surface 162 of the cylindrical wall may define an outer diameter of the attachment element 160. In some embodiments, the inner diameter of the attachment element 160 may be substantially equal to the opening diameter $D_1$ of the opening defined by the port 105. The attachment element 160 may be configured to be coupled to the second supply line 22, which is fluidly coupled to the output 305 of the humidifying apparatus 300. The port 105 fluidly couples the internal cavity 101 to the output 305 of the humidifying apparatus 300 via the second supply line 22.

The shroud 100 may further comprise a baffle 170. The baffle 170 may be located within the internal cavity 101 of the housing 110. The baffle 170 may comprise an upper major surface 171 that is opposite a lower major surface 172. The baffle 170 may extend between a proximal edge 173 and a distal edge 174. The proximal edge 173 may be located adjacent to the first bend 106. The proximal edge 173 may contact the lower major surface 122 of the top plate 120. The proximal edge 173 may contact the second major surface 132 of the first side plate 130.

The baffle 170 may comprise a first lateral edge 176 that is opposite a second lateral edge 177. The first lateral edge 176 may extend between the proximal edge 173 and the distal edge 174. The second lateral edge 177 may extend between the proximal edge 173 and the distal edge 174. The first lateral edge 176 and the second lateral edge 177 may be substantially parallel. Each of the first lateral edge 176 and the second lateral edge 177 may be substantially orthogonal to the proximal edge 176 and the distal edge 177.

The baffle 190 may comprise a baffle plate 170 that extends longitudinally along a longitudinal axis A-A (also referred to as an "elongated baffle plate" 170), whereby the proximal edge 173 and the distal edge 174 extend substantially parallel to the longitudinal axis A-A. Each of the first and second lateral edges 176, 177 may extend substantially orthogonal to the longitudinal axis A-A.

The top plate 120 may extend transversely along a transverse axis C-C that is orthogonal to the longitudinal axis A-A. The second and third edges 124, 125 may extend parallel to the transverse axis C-C, and the first and fourth edges 123, 126 may extend substantially orthogonal to the transverse axis A-A.

The opening axis B-B may be substantially orthogonal to both of the longitudinal axis A-A and the transverse axis C-C.

The baffle plate 170 may be positioned within the internal cavity 101 such that the baffle plate 170 is oriented at an oblique angle to the top plate 120. In some embodiments, a first angle $\theta_1$ may be measured between the upper major surface 171 of the baffle plate 170 and the lower major surface 122 of the top plate 120, whereby the first angle $\theta_1$ is an acute angle. In some embodiments, the first angle $\theta_1$ may range from about 10 to about—including all angles and sub-ranges there-between. In some embodiments, the first angle $\theta_1$ may be about 5°.

The internal cavity 101 may comprise an upper region 102 and a lower region 103. The upper region 102 of the internal cavity 101 may be the volume occupied above the baffle plate 170 and below the top plate 120. The upper region 102 of the internal cavity 101 may be the volume occupied above the upper major surface 171 of the baffle plate 170 and below lower major surface 122 of the top plate 120. The lower region 103 of the internal cavity 101 may be the volume occupied below the baffle plate 170. The lower region 103 of the internal cavity 101 may be the volume occupied below the lower major surface 172 of the baffle plate 170 and above the second bottom edge 143 of the second side plate 140 and the third bottom edge 153 of the third side plate 150.

The baffle 190 may be positioned within the internal cavity 101 such that the baffle plate 170 at least partially overlaps with the port 105 in a vertical direction. The baffle 190 may be positioned within the internal cavity 101 such that the baffle 170 at least partially overlaps with the port 105 in a direction that is substantially parallel to the opening axis B-B. The baffle 190 may be positioned within the internal cavity 101 such that the baffle plate 170 comprising an overlapping portion 178 that at least partially blocks a line of sight between the upper region 102 and the lower region 103 of the internal cavity when viewing the internal cavity 101 through the port 105 in a downward direction that is parallel to the opening axis B-B.

The baffle plate 170 may comprise a cutout section 175. The cutout section 175 may be formed into the distal edge 174 of the baffle plate 170. The cutout section 175 may be a void formed into the distal edge 174 of the baffle plate 170. Although not limited to, the cutout section 175 may be semi-circular in shape having a cutout diameter $D_2$. The cutout diameter may be smaller than the opening diameter $D_1$. The cutout diameter $D_2$ may range from 1.75 inches to about 3.75 inches—including all diameters and subranges there-between. In some embodiments, the opening diameter $D_1$ may be about 3.25 inches.

The opening diameter $D_1$ of the opening of the port 105 may be greater than the cutout diameter $D_2$ of the cutout section 175 of the baffle plate 170. The width of the overlapping portion 178 of the baffle plate 170 may be substantially equal to the difference in the opening diameter $D_1$ of the opening of the port 105 and the cutout diameter $D_2$ of the cutout section 175 of the baffle 170. A ratio of the opening diameter $D_1$ to the cutout diameter $D_2$ may range from about 1.05:1 to about 1.25:1—including all ratios and subranges there-between. In some embodiments, the ratio of the opening diameter $D_1$ to the cutout diameter $D_2$ may range from about 1.05:1 to about 1.15:1—including all ratios and subranges there-between. In some embodiments, the ratio of the opening diameter $D_1$ to the cutout diameter $D_2$ may range from about 1.05:1 to about 1.1:1—including all ratios and subranges there-between.

The baffle 190 may be positioned within the internal cavity 101 such that the cutout section 175 of the baffle plate 170 at least partially overlaps with the port 105 in a vertical direction. The baffle 190 may be positioned within the internal cavity 101 such that the cutout section 175 at least partially overlaps with the port 105 in a direction that is substantially parallel to the opening axis B-B.

The baffle 190 may comprise a wall 180 extending upwards from the baffle plate 170 in a direction towards the top plate 120. The wall 180 extends vertically between a bottom edge 184 and a top edge 183. The bottom edge 184 of the wall being adjacent to the upper major surface 171 of the baffle plate 170. The wall 180 having a height $H_w$ as measured between the top edge 183 and the bottom edge 184 of the wall 180. The height $H_w$ of the wall 180 may range from about 0.3 inches to about 0.7 inches—including all heights and sub-ranges there-between.

The top edge 183 of the wall 180 may be substantially parallel to the top plate 120. The top edge 183 of the wall 180 may be substantially parallel to the lower major surface 122 of the top plate 120. The top edge 183 of the wall 180 may be substantially parallel to the upper major surface 121 of the top plate 120.

The bottom edge 184 of the wall 180 may be substantially parallel to the upper major surface 171 of the baffle plate 170. With the top edge 183 of the wall 180 being substantially parallel to the top plate 120 and the baffle plate 170 oriented at the first angle $\theta_1$ as measured between the upper major surface 171 of the baffle plate 170 and the lower major surface 122 of the top plate 120, the height $H_w$ of the wall 180 may vary with distance from the proximal edge 173 of the baffle plate 170 to the distal edge 174 of the baffle plate 170. Specifically, the height $H_w$ of the wall 180 may increase when moving from the proximal edge 173 of the baffle plate 170 to the distal edge 174 of the baffle plate 170.

The height $H_w$ of the wall 180 adjacent to the distal edge 174 of the baffle plate 170 may range from about 0.45 inches to about 0.85 inches—including all heights and sub-ranges there-between. In some embodiments, the height $H_w$ of the wall 180 adjacent to the distal edge 174 of the baffle plate 170 may range from about 0.55 inches to about 0.75 inches—including all heights and sub-ranges there-between. In some embodiments, the height $H_w$ of the wall 180 adjacent to the distal edge 174 of the baffle plate 170 may be about 0.64 inches.

The height $H_w$ of the wall 180 adjacent to the proximal edge 173 of the baffle plate 170 may range from about 0.3 inches to about 0.6 inches—including all heights and sub-ranges there-between. In some embodiments, the height $H_w$ of the wall 180 adjacent to the proximal edge 173 of the baffle plate 170 may be about 0.5 inches.

The wall 180 may extend through and above the port 105. According to the embodiments where the shroud 100 comprises the attachment element 160, the wall 180 may at least partially overlap with the attachment element 160 in a horizontal direction. The top edge 183 of the wall 180 may extend above the top plate 120 by wall offset height $H_{W1}$. The wall offset height $H_{W1}$ may range from about 0.1 inches to about 0.4 inches—including all heights and sub-ranges there-between. In some embodiments, the wall offset height $H_{W1}$ may range from about 0.15 inches to about 0.35 inches—including all heights and sub-ranges there-between. In some embodiments, the wall offset height $H_{W1}$ may range from about 0.2 inches to about 0.3 inches—including all heights and sub-ranges there-between. In some embodiments, the wall offset height $H_{W1}$ may be about 0.25 inches. The wall offset height $H_{W1}$ may be measured from the top edge 183 to the upper major surface 121 of the top plate 120.

The top edge 183 of the wall may be substantially parallel to the lower surface 122 of the top plate 120.

The wall 180 may comprise an inner major surface 181 that is opposite an outer major surface 182. The inner major surface 181 of the wall 180 may face the cutout section 175 of the baffle plate 170. The wall 180 may be configured to follow the portion of the distal edge 174 of the baffle plate 170 that forms a boundary of the cutout section 175 of the baffle plate 170.

The baffle 190 may be positioned within the internal cavity 101 such that the wall 180 at least partially overlaps with the port 105 in a vertical direction. The baffle 190 may be positioned within the internal cavity 101 such that the wall 180 at least partially overlaps with the port 105 in a direction that is substantially parallel to the opening axis B-B.

The baffle 190 may be positioned within the internal cavity 101 such that the proximal edge 173 of the baffle plate 170 does not overlaps with the port 105 in a vertical direction. The baffle 190 may be positioned within the internal cavity 101 such that proximal edge 173 of the baffle plate 170 does not overlap with the port 105 in a direction that is substantially parallel to the opening axis B-B.

Referring now to FIGS. 1 and 10-18, the coating system 1 includes the coating assembly 10, which includes the applicator head 200 and the shroud 100. The applicator head 200 may comprise an applicator housing 210 and an applicator nozzle 220, whereby the applicator nozzle 220 may have a leading edge 221. A coating supply line 23 may be coupled to an input of the applicator head 200, whereby the coating supply line 23 is fluidly coupled to a coating composition reservoir containing a coating composition.

The applicator head 200 is configured to apply the coating composition to a surface 31, 32, 33, 34 of a workpiece 30—whereby the coating composition may be emitting from the applicator nozzle 210 to the surface 31, 32, 33, 34 of a workpiece 30—whereby the workpiece comprises a first major surface 31 opposite a second major surface 32 and at least a first side surface 33 opposite a second side surface 34, whereby the first and second side surfaces 33, 34 extend between the first and second major surfaces 31, 32. The coating composition may be supplied to the coating head 200 via the coating supply line 23.

The coating composition may be a liquid-based coating composition. The coating composition may comprise a binder, a particulate, and a liquid carrier. Non-limiting examples of particulate include pigment, filler, and combinations thereof. Non-limiting examples of binder include polymeric binder. The liquid carrier may comprise water. The coating composition may have a high-solids content—the term "high solids content" refers to a liquid based coating composition having a solids content of at least 60 wt. % based on the total weight of the coating composition. The coating composition may have a solids content ranging from about 65 wt. % to about 90 wt. % based on the total weight of the coating composition—including all percentages and sub-ranges there-between.

The support apparatus 500 may comprise a frame 510 and a conveyor surface 520. The frame may comprise a second securing element 516. The second securing element 516 may be configured to couple to the first securing element 137 located on the first side plate 130 of the shroud 100.

The frame 510 may comprise a lower portion 511 and an upper portion 512. The upper portion 512 may comprise an coupling plate 515, whereby the second securing element 137 is located on the coupling plate 515.

The conveyor surface 520 may be configured to support a first or second major surface 31, 32 of a workpiece 30 during the coating process of the present invention. In a non-limiting example, the conveyor surface 520 may be a belt, rollers, or the like. In some embodiments, the conveyor surface 520 may be located atop the lower portion 511 of the frame 510.

The conveyor surface 520 may move along a machine direction MD that is substantially parallel to the longitudinal axis A-A of the shroud 100. During the coating process of the present invention, the conveyor 520 may move relative to the coating assembly 10—whereby the shroud 100 and the applicator head 200 do not move relative to each other.

In other embodiments, the conveyor surface 520 may be stationary. During the coating process of the present invention, the workpiece 30 and the coating assembly 10 may move relative to each other along the machine direction MD—whereby the shroud 100 and the applicator head 200 do not move relative to each other. During the coating process of the present invention, the applicator head 200 and the frame 510 may not move relative to each other and the shroud 100 and the applicator head 200 do not move relative to each other.

Figure 12:
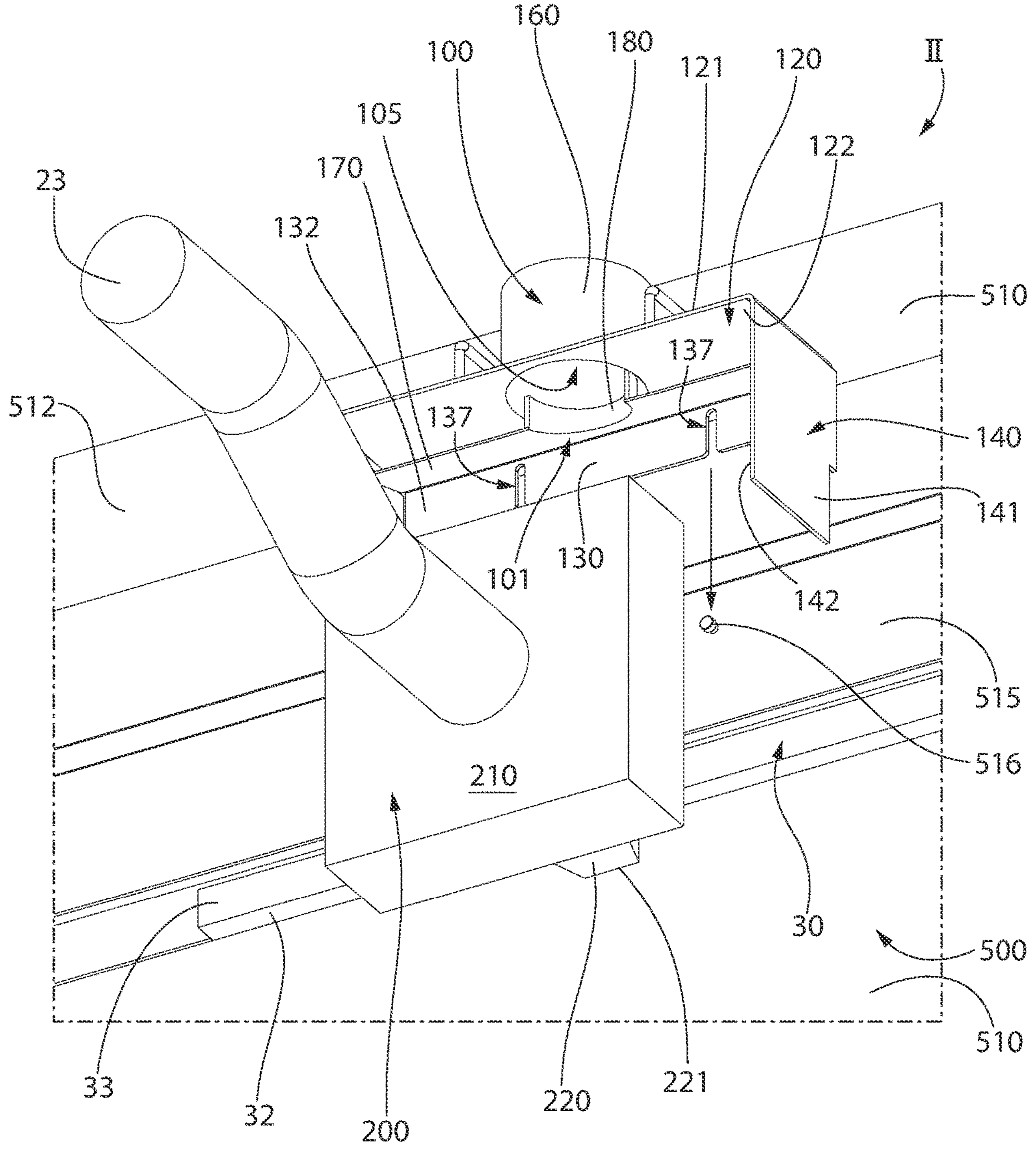
FIG. 12 is a perspective view of the close-up region X of FIG. 10, the coating assembly in a second state.
Figure 13A:
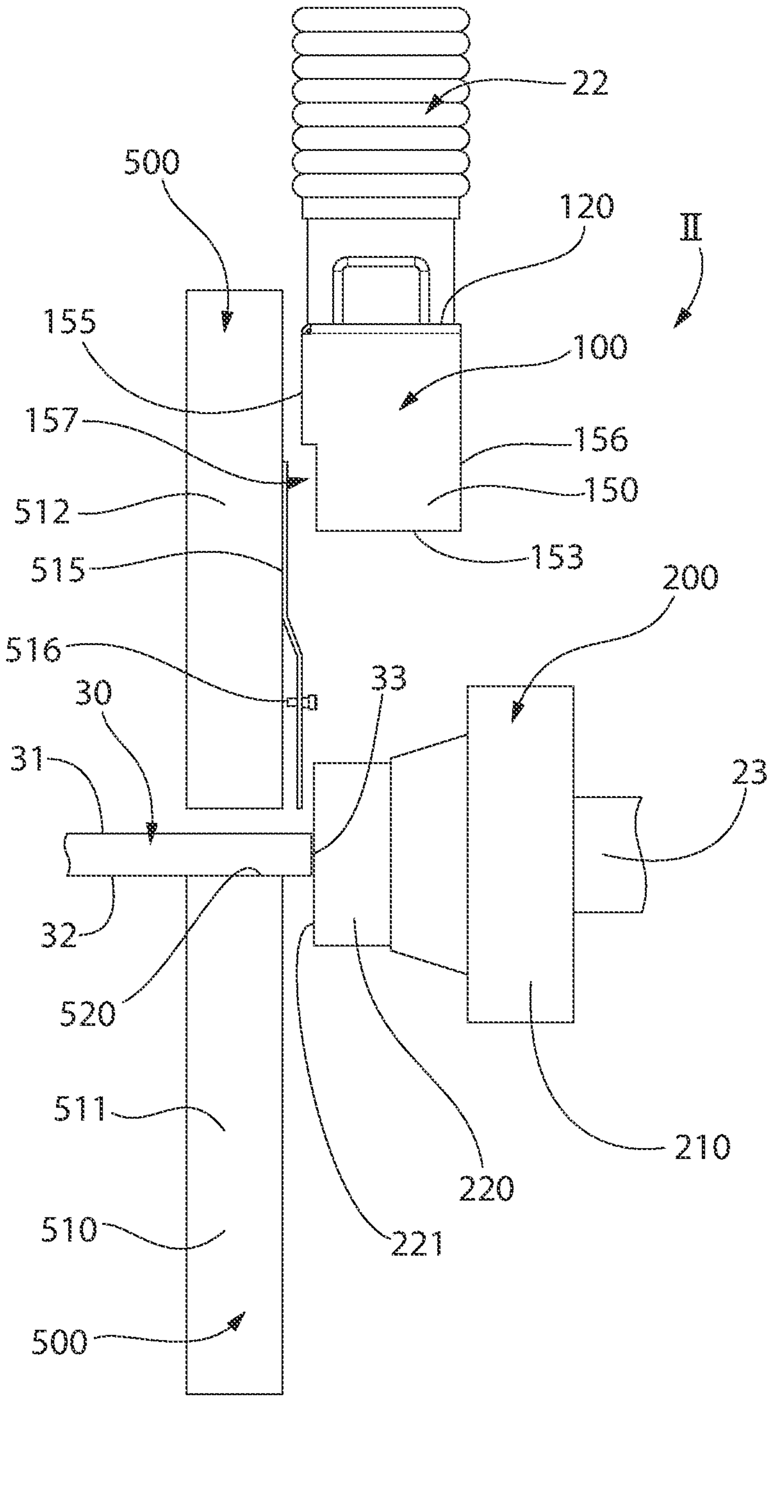
FIG. 13A is a side view of the close-up region X of FIG. 12.
Figure 13B:
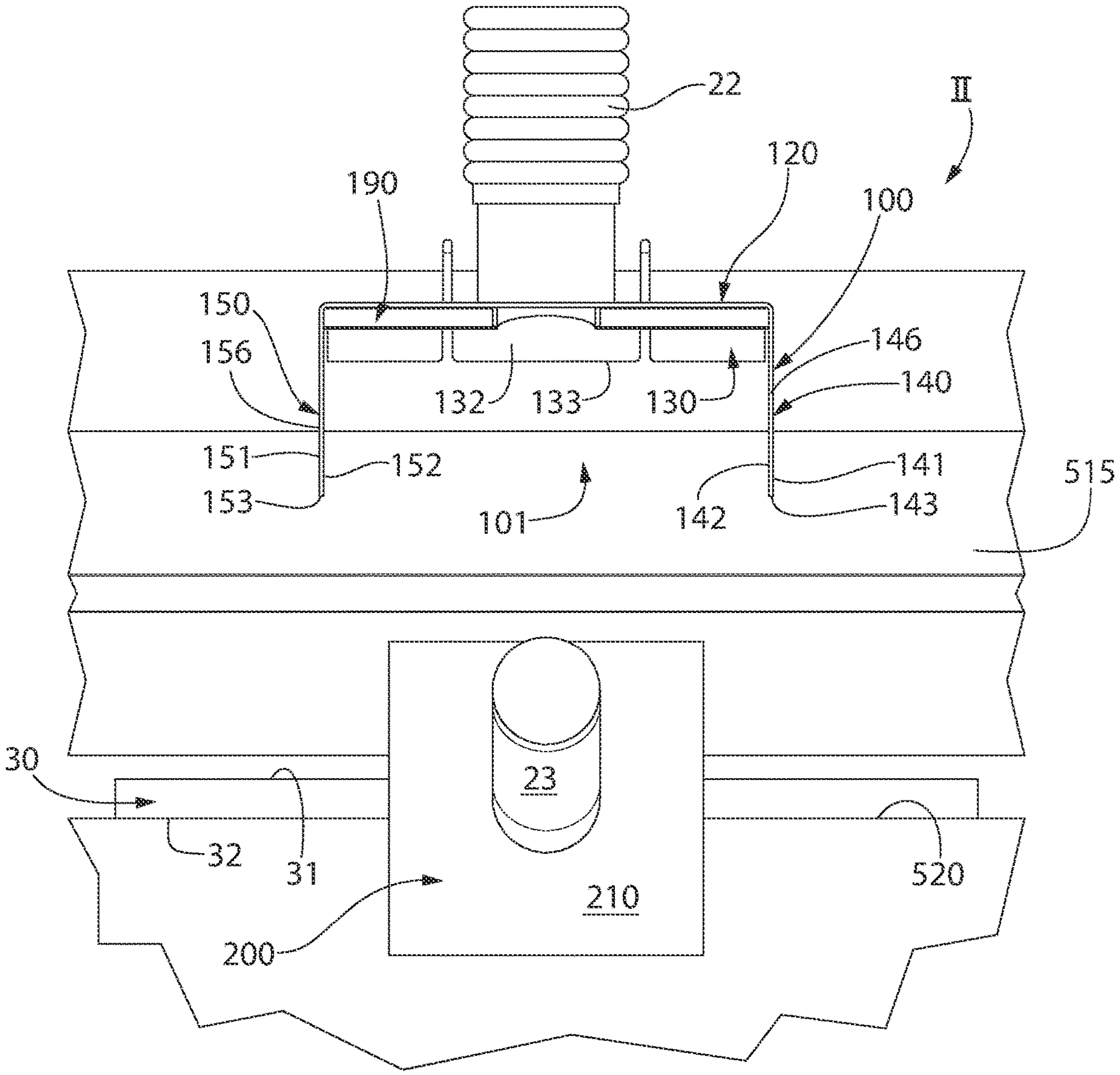
FIG. 13B is rear view of the close-up region X of FIG. 12.
Figure 14:
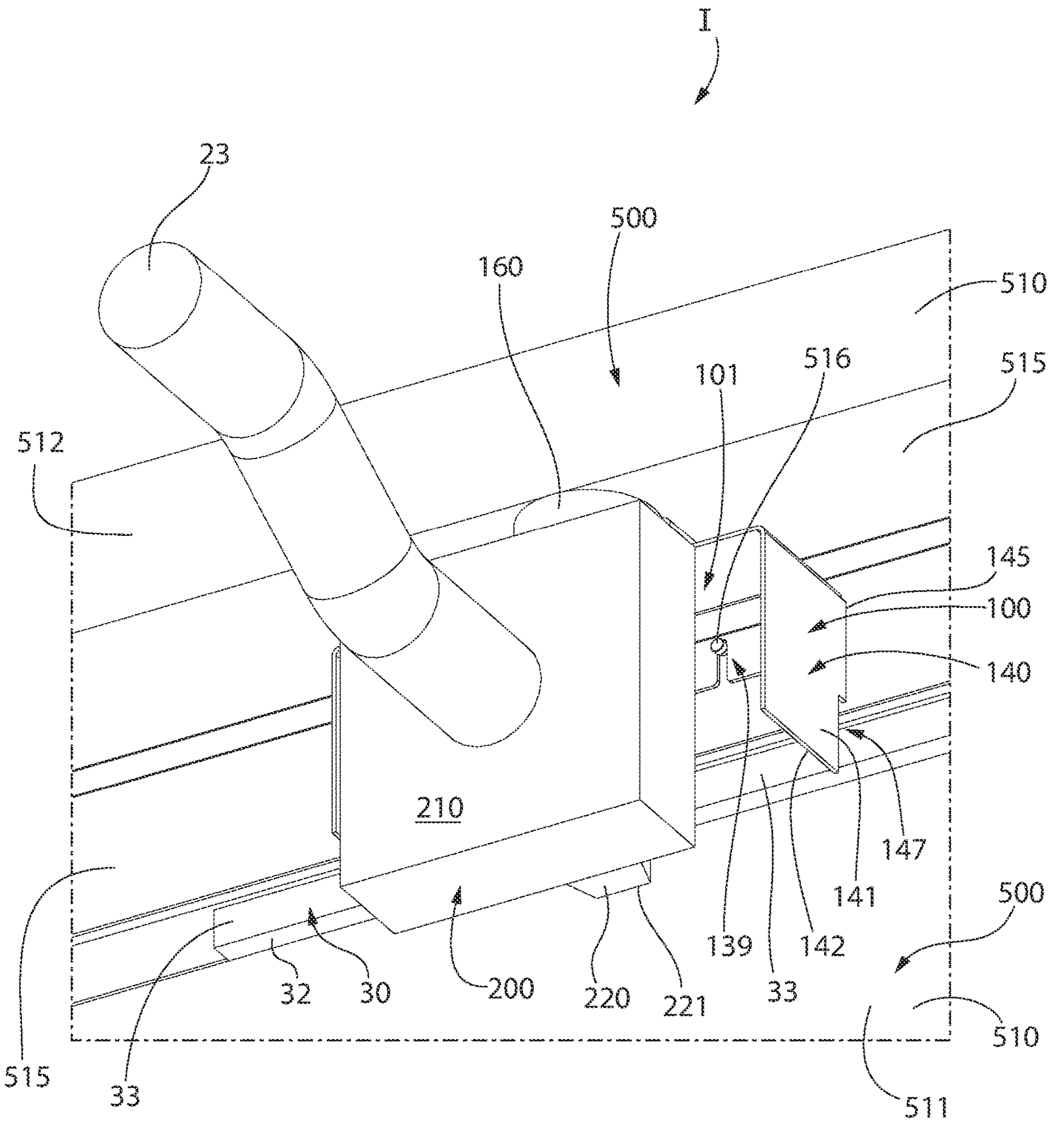
FIG. 14 is a perspective view of the close-up region X of FIG. 10, the coating assembly in a first state.
Figure 15A:
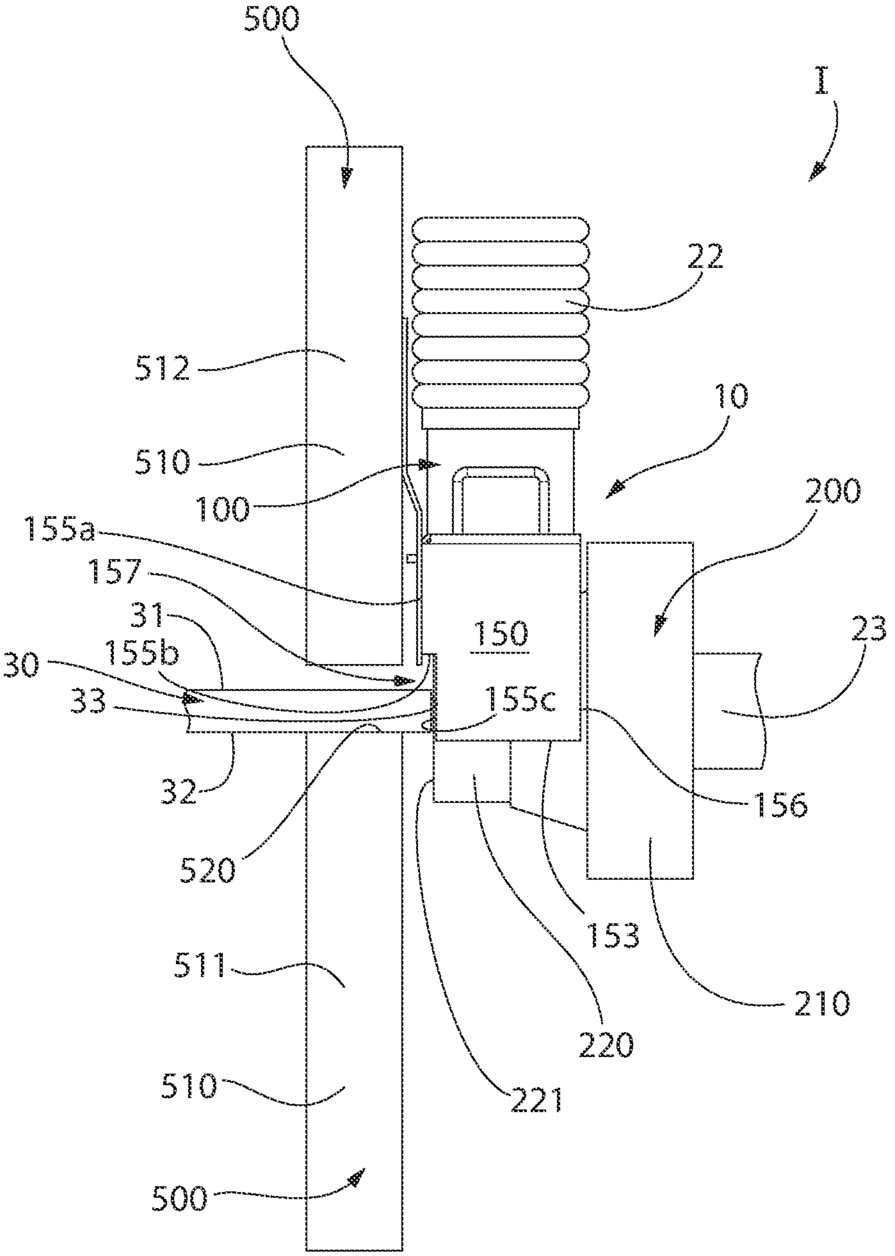
FIG. 15A is a side view of the close-up region X of FIG. 14.
Figure 15B:
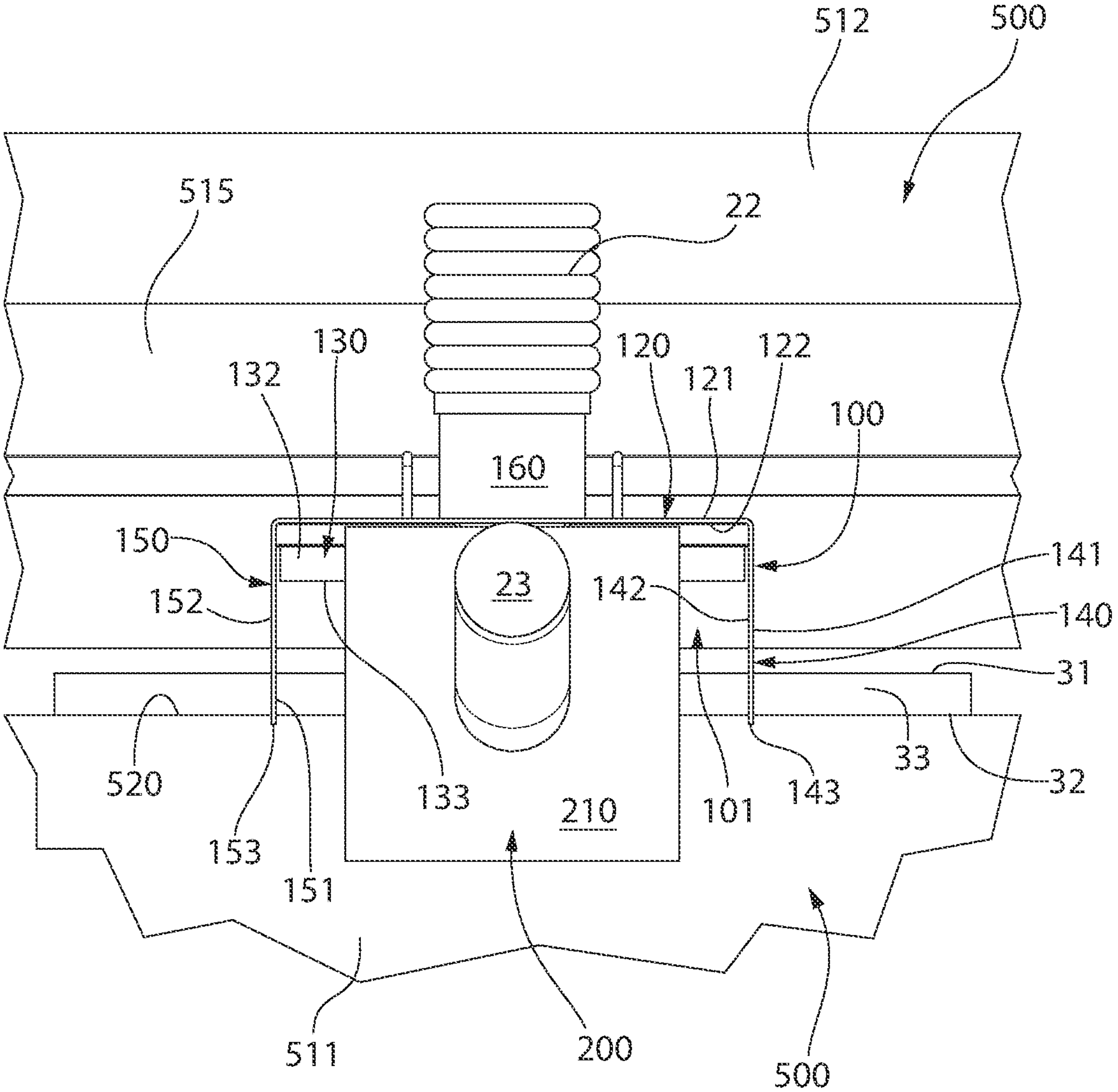
FIG. 15B is rear view of the close-up region X of FIG. 14.
Figure 16A:
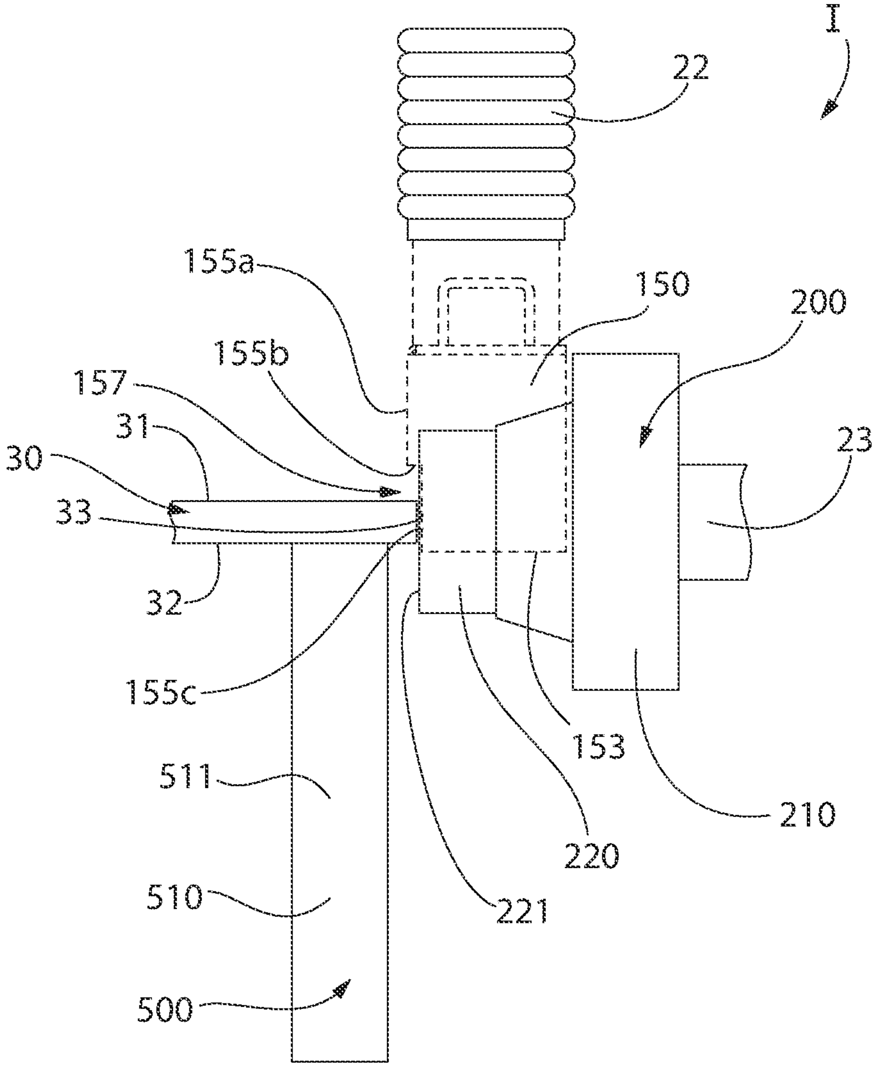
FIG. 16A is a side view of the close-up region X of FIG. 14, whereby the shroud is represented transparently.
Figure 16B:
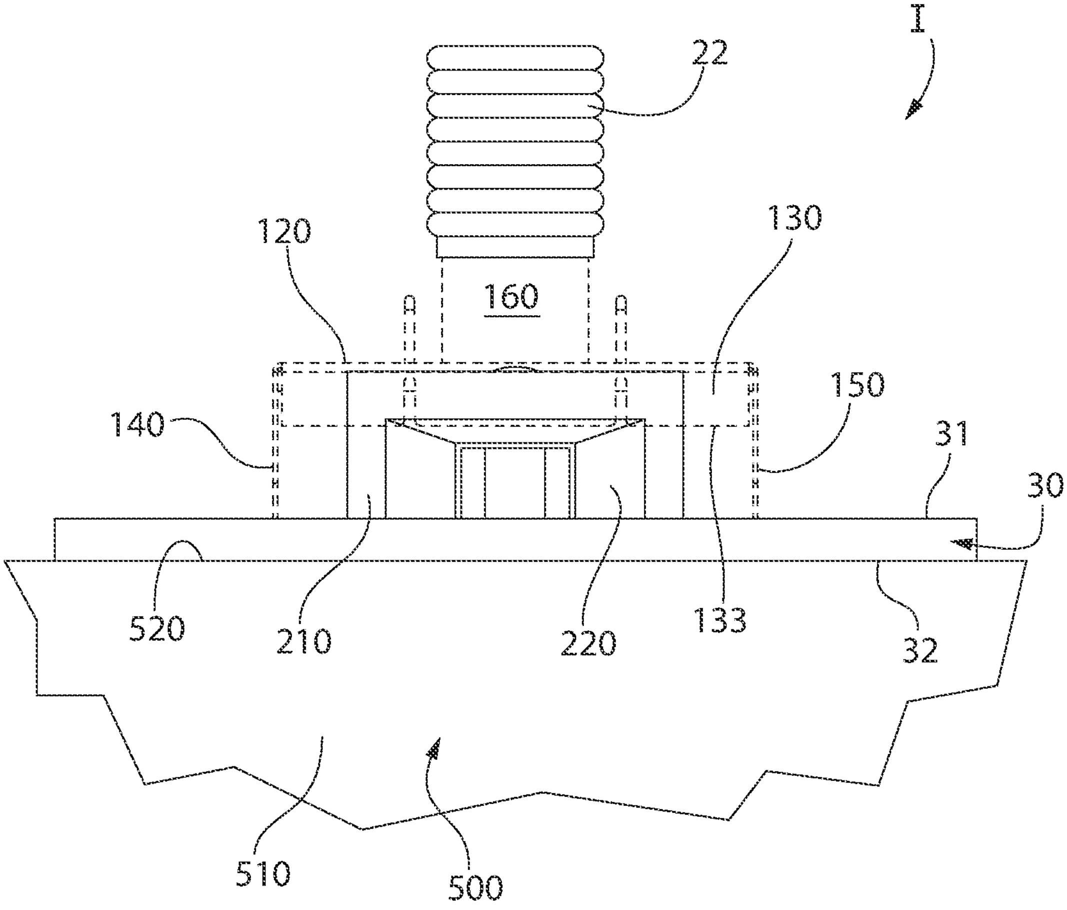
FIG. 16B is a front view of the close-up region X of FIG. 14, whereby the shroud is represented transparently.
Figure 17:
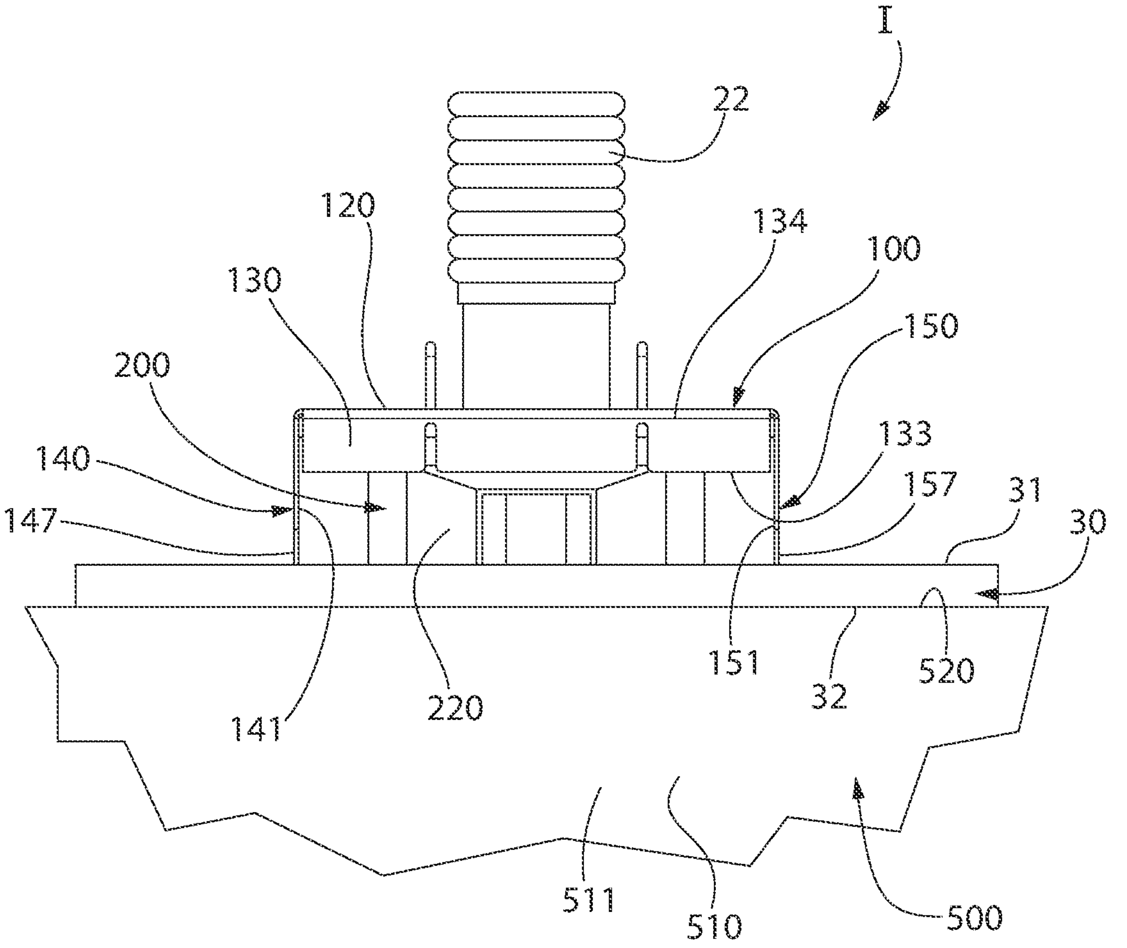
FIG. 17 is a side view of the close-up region X of FIG. 14.
Figure 18:
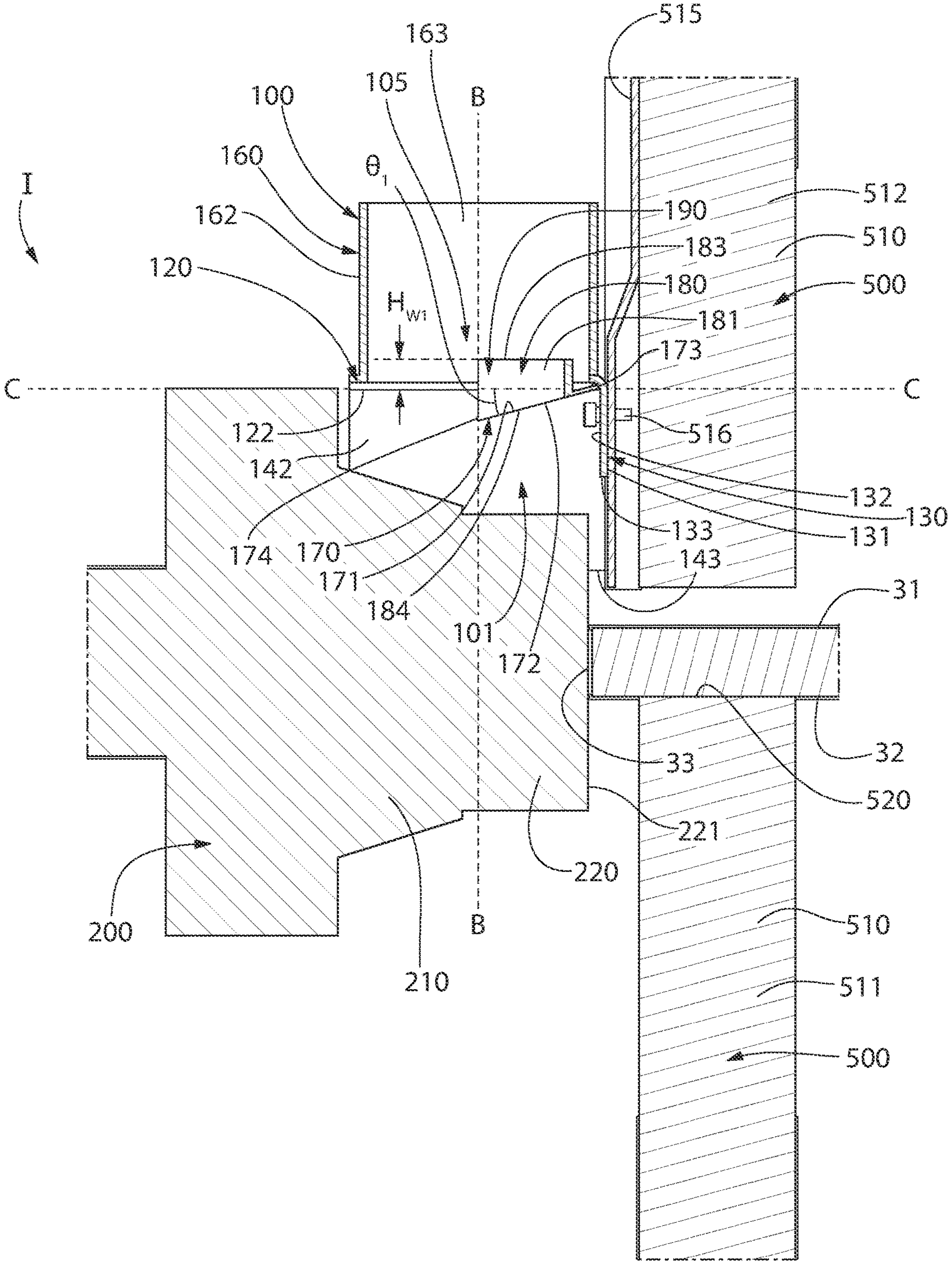
FIG. 18 is a close-up cross-sectional view of the coating system of the present invention, the close-up view showing the coating assembly in the first state.

The coating assembly 10 may be alterable between a first state I, as shown in FIGS. 10, 11, 14-18, and a second state II, as shown in FIGS. 12, 13A, and 13B. In the first state I the applicator head 200 may be at least partially located inside of the internal cavity 101 of the shroud 100. In the second state II the applicator head 200 may be located outside of the internal cavity 101 of the shroud 100.

As demonstrated by FIGS. 12-18, in the first state I, the applicator nozzle 220 may be at least partially located inside of the internal cavity 101 of the shroud 100. In the first state I, the applicator housing 210 may be at least partially located inside of the internal cavity 101 of the shroud 100. In the second state II, the applicator nozzle 220 may be outside (i.e., external to) the internal cavity 101 of the shroud 100. In the second state II, the applicator housing 210 may be outside the internal cavity 101 of the shroud 100.

In the first state I, the first side plate 130 may at least partially overlap with the applicator head 200 in a horizontal direction that is substantially parallel to the transverse axis C-C. In the first state I, the first side plate 130 may at least partially overlap with the applicator housing 210 in the horizontal direction that is substantially parallel to the transverse axis C-C. In the first state I, the first bottom edge 133 may at least partially overlap at least one of the first major surface 31 and/or the second major surface 32 of the workpiece 30 in a vertical direction that is substantially parallel to the opening axis B-B.

In the second state II, the first side plate 130 and the applicator head 200 may not overlap in the horizontal direction that is substantially parallel to the transverse axis C-C. In the second state II, the first side plate 130 and the applicator housing 210 may not overlap in the horizontal direction that is substantially parallel to the transverse axis C-C. In the second state II, the first bottom edge 133 may at least partially overlap at least one of the first major surface 31 and/or the second major surface 32 of the workpiece 30 in the vertical direction that is substantially parallel to the opening axis B-B.

In the first state I, the second side plate 140 may at least partially overlap with the applicator head 200 in a horizontal direction that is substantially parallel to the longitudinal axis A-A. In the first state I, the second side plate 140 may at least partially overlap with the applicator housing 210 in the horizontal direction that is substantially parallel to the longitudinal axis A-A. In the first state I, the second side plate 140 may at least partially overlap with the applicator nozzle 220 in the horizontal direction that is substantially parallel to the longitudinal axis A-A. In the first state I, the second side plate 140 may at least partially overlap with the leading edge 221 of the applicator nozzle 220 in the horizontal direction that is substantially parallel to the longitudinal axis A-A.

In the second state II, the second side plate 140 and the applicator head 200 may not overlap in the horizontal direction that is substantially parallel to the longitudinal axis A-A. In the second state II, the second side plate 140 and the applicator housing 210 may not overlap in the horizontal direction that is substantially parallel to the longitudinal axis A-A. In the first state I, the second side plate 140 and the applicator nozzle 220 may not overlap in the horizontal direction that is substantially parallel to the longitudinal axis A-A. In the second state II, the second side plate 140 and the leading edge 221 of the applicator nozzle 220 may not overlap in the horizontal direction that is substantially parallel to the longitudinal axis A-A.

In the first state I, a plane that is parallel to the longitudinal axis A-A and the transverse axis C-C may intersect both the first portion **145*a* of the first side edge 145 of the second side plate 140 and the applicator head 200. In the first state I, the plane that is parallel to the longitudinal axis A-A and the transverse axis C-C may intersect both the first portion 145*a* of the first side edge 145 of the second side plate 140 and the applicator housing 210. In the first state I, the plane that is parallel to the longitudinal axis A-A and the transverse axis C-C may intersect the first portion 145*a* of the first side edge 145 of the second side plate 140 and the applicator nozzle 220**.

In the second state II, the plane that is parallel to the longitudinal axis A-A and the transverse axis C-C may not intersect both the first portion **145*a* of the first side edge 145 of the second side plate 140 and the applicator head 200. In the second state II, the plane that is parallel to the longitudinal axis A-A and the transverse axis C-C may not intersect both the first portion 145*a* of the first side edge 145 of the second side plate 140 and the applicator housing 210. In the second state II, the plane that is parallel to the longitudinal axis A-A and the transverse axis C-C may not intersect both the first portion 145*a* of the first side edge 145 of the second side plate 140 and the applicator nozzle 220**.

In the first state I, a plane that is parallel to the longitudinal axis A-A and the transverse axis C-C may intersect the third portion **145*c* of the first side edge 145 of the second side plate 140 and the applicator head 200. In the first state I, the plane that is parallel to the longitudinal axis A-A and the transverse axis C-C may intersect the third portion 145*c* of the first side edge 145 of the second side plate 140 and the applicator housing 210. In the first state I, the plane that is parallel to the longitudinal axis A-A and the transverse axis C-C may intersect the third portion 145*c* of the first side edge 145 of the second side plate 140 and the applicator nozzle 220**.

In the second state II, the plane that is parallel to the longitudinal axis A-A and the transverse axis C-C may not intersect both the third portion **145*c* of the first side edge 145 of the second side plate 140 and the applicator head 200. In the second state II, the plane that is parallel to the longitudinal axis A-A and the transverse axis C-C may not intersect both the third portion 145*c* of the first side edge 145 of the second side plate 140 and the applicator housing 210. In the second state II, the plane that is parallel to the longitudinal axis A-A and the transverse axis C-C may not intersect both the third portion 145*c* of the first side edge 145 of the second side plate 140 and the applicator nozzle 220**.

In the first state I, the second portion **145*b* of the first side edge 145 of the second side plate 140 may at least partially overlap with at least one of the first and/or second major surface 31, 32 of the workpiece 30 in a vertical direction that is parallel to the opening axis B-B. In the first state I, the third portion 145*c* of the first side edge 145 of the second side plate 140 may at least partially overlap with at least one of the first and/or second side surfaces 33, 33 of the workpiece 30** in a horizontal direction that is substantially parallel to the transverse axis C-C.

In the second state II, the second portion **145*b* of the first side edge 145 of the second side plate 140 may at least partially overlap with at least one of the first and/or second major surface 31, 32 of the workpiece 30 in the vertical direction that is parallel to the opening axis B-B. In the second state II, the third portion 145*c* of the first side edge 145 of the second side plate 140 and the first and/or second side surfaces 33, 33 of the workpiece 30** may not overlap in the horizontal direction that is parallel to the transverse axis C-C.

In the first state I, the second bottom edge 143 of the second side plate 140 may be located beneath both of the first major surface 31 and the second major surface 32 of the workpiece 30. In the first state I, the second bottom edge 143 of the second side plate 140 may be located beneath the conveyor 520 of the support apparatus 500.

In the second state II, the second bottom edge 143 of the second side plate 140 may be located above both of the first major surface 31 and the second major surface 32 of the workpiece 30. In the second state II, the second bottom edge 143 of the second side plate 140 may be located above the conveyor 520 of the support apparatus 500.

In the first state I, the third side plate 150 may at least partially overlap with the applicator head 200 in a horizontal direction that is substantially parallel to the longitudinal axis A-A. In the first state I, the third side plate 150 may at least partially overlap with the applicator housing 210 in the horizontal direction that is substantially parallel to the longitudinal axis A-A. In the first state I, the third side plate 150 may at least partially overlap with the applicator nozzle 220 in the horizontal direction that is substantially parallel to the longitudinal axis A-A. In the first state I, the third side plate 150 may at least partially overlap with the leading edge 221 of the applicator nozzle 220 in a horizontal direction.

In the second state II, the third side plate 150 and the applicator head 200 may not overlap in the horizontal direction that is substantially parallel to the longitudinal axis A-A. In the second state II, the third side plate 150 and the applicator housing 210 may not overlap in the horizontal direction that is substantially parallel to the longitudinal axis A-A. In the first state I, the third side plate 150 and the applicator nozzle 220 may not overlap in the horizontal direction that is substantially parallel to the longitudinal axis A-A. In the second state II, the third side plate 150 and the leading edge 221 of the applicator nozzle 220 may not overlap in the horizontal direction that is substantially parallel to the longitudinal axis A-A.

In the first state I, a plane that is parallel to the longitudinal axis A-A and the transverse axis C-C may intersect both the first portion **155*a* of the first side edge 155 of the third side plate 150 and the applicator head 200. In the first state I, the plane that is parallel to the longitudinal axis A-A and the transverse axis C-C may intersect both the first portion 155*a* of the first side edge 155 of the third side plate 150 and the applicator housing 210. In the first state I, the plane that is parallel to the longitudinal axis A-A and the transverse axis C-C may intersect both the first portion 155*a* of the first side edge 155 of the third side plate 150 and the applicator nozzle 220**.

In the second state II, the plane that is parallel to the longitudinal axis A-A and the transverse axis C-C may not intersect both the first portion **155*a* of the first side edge 155 of the third side plate 150 and the applicator head 200. In the second state II, the plane that is parallel to the longitudinal axis A-A and the transverse axis C-C may intersect both the first portion 155*a* of the first side edge 155 of the third side plate 150 and the applicator housing 210. In the second state II, a plane that is parallel to the longitudinal axis A-A and the transverse axis C-C may intersect both the first portion 155*a* of the first side edge 155 of the third side plate 150 and the applicator nozzle 220**.

In the first state I, a plane that is parallel to the longitudinal axis A-A and the transverse axis C-C may intersect both the third portion **155*c* of the first side edge 155 of the third side plate 150 and the applicator head 200. In the first state I, the plane that is parallel to the longitudinal axis A-A and the transverse axis C-C may intersect both the third portion 155*c* of the first side edge 155 of the third side plate 150 and the applicator housing 210. In the first state I, the plane that is parallel to the longitudinal axis A-A and the transverse axis C-C may intersect both the third portion 155*c* of the first side edge 155 of the third side plate 150 and the applicator nozzle 220**.

In the second state II, the plane that is parallel to the longitudinal axis A-A and the transverse axis C-C may not intersect both the third portion **155*c* of the first side edge 155 of the third side plate 150 and the applicator head 200. In the second state II, the plane that is parallel to the longitudinal axis A-A and the transverse axis C-C may not intersect both the third portion 155*c* of the first side edge 155 of the third side plate 150 and the applicator housing 210. In the second state II, the plane that is parallel to the longitudinal axis A-A and the transverse axis C-C may not intersect both the third portion 155*c* of the first side edge 155 of the third side plate 150 and the applicator nozzle 220**.

In the first state I, the second portion **155*b* of the first side edge 155 of the third side plate 150 may at least partially overlap with at least one of the first and/or second major surface 31, 32 of the workpiece 30 in a vertical direction that is substantially parallel to the opening axis B-B. In the first state I, the third portion 155*c* of the first side edge 155 of the third side plate 150 may at least partially overlap with at least one of the first and/or second side surfaces 33, 33 of the workpiece 30** in a horizontal direction that is substantially parallel to the transverse axis C-C.

In the second state II, the second portion **155*b* of the first side edge 155 of the third side plate 150 may at least partially overlap with at least one of the first and/or second major surface 31, 32 of the workpiece 30 in the vertical direction that is substantially parallel to the opening axis B-B. In the second state II, the third portion 155*c* of the first side edge 155 of the third side plate 150 and the at least one of the first and/or second side surfaces 33, 33 of the workpiece 30** may not overlap in the horizontal direction that is substantially parallel to the transverse axis C-C.

In the first state I, the third bottom edge 153 of the third side plate 150 may be located beneath both of the first major surface 31 and the second major surface 32 of the workpiece 30. In the first state I, the third bottom edge 153 of the third side plate 150 may be located beneath the conveyor 520 of the support apparatus 500.

In the second state II, the third bottom edge 153 of the third side plate 150 may be located above both of the first major surface 31 and the second major surface 32 of the workpiece 30. In the second state II, the third bottom edge 153 of the third side plate 150 may be located above the conveyor 520 of the support apparatus 500.

In the first state I, the top plate 120 may at least partially overlap with the applicator head 200 in a vertical direction that is substantially parallel to the opening axis B-B. In the first state I, the top plate 120 may at least partially overlap with the applicator housing 210 in the vertical direction that is substantially parallel to the opening axis B-B. In the first state I, the top plate 120 may at least partially overlap with the applicator nozzle 220 in a vertical direction that is substantially parallel to the opening axis B-B. In the first state I, the top plate 120 may at least partially overlap with the leading edge 221 of the applicator nozzle 220 in a vertical direction that is substantially parallel to the opening axis B-B. In the first state I, the first edge 123 of the top plate 120 may at least partially overlap with the first and/or second major surface 31, 32 of the workpiece 30 a vertical direction that is substantially parallel to the opening axis B-B.

In the second state II, the top plate 120 may at least partially overlap with the applicator head 200 in the vertical direction that is substantially parallel to the opening axis B-B. In the second state II, the top plate 120 may at least partially overlap with the applicator housing 210 in the vertical direction that is substantially parallel to the opening axis B-B. In the second state II, the top plate 120 may at least partially overlap with the applicator nozzle 220 in a vertical direction that is substantially parallel to the opening axis B-B. In the second state II, the top plate 120 may at least partially overlap with the leading edge 221 of the applicator nozzle 220 in a vertical direction that is substantially parallel to the opening axis B-B.

The shroud 100 may be altered between the first state I and the second state II by moving the shroud 100 relative to the applicator head 200. The shroud 100 may be altered between the first state I and the second state II by moving the shroud 100 vertically relative to the applicator head 200.

The shroud 100 may be altered between the first state I and the second state II by moving the shroud 100 relative to the applicator nozzle 220. The shroud 100 may be altered between the first state I and the second state II by moving the shroud 100 vertically relative to the applicator nozzle 220.

The shroud 100 may be altered between the first state I and the second state II by moving the shroud 100 relative to the applicator housing 210. The shroud 100 may be altered between the first state I and the second state II by moving the shroud 100 vertically relative to the applicator housing 210.

The shroud 100 may be altered between the first state I and the second state II by moving the shroud relative to the support apparatus 500. The shroud 100 may be altered between the first state I and the second state II by moving the shroud vertically relative to the support apparatus 500.

The shroud 100 may be altered between the first state I and the second state II by moving the shroud relative to the frame 510 of the support apparatus 500. The shroud 100 may be altered between the first state I and the second state II by moving the shroud vertically relative to the frame 510 of the support apparatus 500.

The shroud 100 may be altered between the first state I and the second state II by moving the shroud relative to the conveyor 520 of the support apparatus 500. The shroud 100 may be altered between the first state I and the second state II by moving the shroud vertically relative to the conveyor 520 of the support apparatus 500.

The shroud 100 may be altered between the first state I and the second state II by gripping one or more handle elements 108 and lifting and/or pulling the shroud 100 upward and/or downward between the first state I and second state II. The handle elements 108 may extend upward from the upper major surface 121 of the top plate 120.

In the first state I, with the applicator head 200 located at least partially within the internal cavity 101 of the shroud 100, the coating system 1 may be operated such that the humidifying apparatus 300 feeds humid air 40 from the output 305 of the humidifying apparatus 300 to the internal cavity 101 via the second supply line 22 and the opening of the port 105. Stated otherwise, the humidifying apparatus 300 is configured to introduce the humid air 40 to the internal cavity 101 of the shroud 100. The port 105 may be fluidly couple the internal cavity 101 of the shroud 100 to the second output 305 of the humidifying apparatus 300.

In the first state I, the leading edge 221 of the applicator nozzle 220 and the distal edge 174 of the baffle plate 170 do not overlap in a vertical direction that is substantially parallel to the opening axis B-B. In the first state I, the leading edge 221 of the applicator nozzle 220 may positioned such that the leading edge 221 of the applicator nozzle 220 is between the second major surface 132 of the first side plate 130 and the outer major surface 182 of the wall 180 in a horizontal direction that is substantially parallel to the transverse axis B-B.

As the humid air 40 enters the internal cavity 101 of the shroud 100 when the shroud 100 is in the first state I, the humid air 40 inside of the internal cavity 101 of the shroud 100 that contacts an applicator head 200. As the humid air 40 enters the internal cavity 101 of the shroud 100 when the shroud 100 is in the first state I, the humid air 40 inside of the internal cavity 101 of the shroud 100 that contacts an applicator housing 210. As the humid air 40 enters the internal cavity 101 of the shroud 100 when the shroud 100 is in the first state I, the humid air 40 inside of the internal cavity 101 of the shroud 100 that contacts an applicator nozzle 220. As the humid air 40 enters the internal cavity 101 of the shroud 100 when the shroud 100 is in the first state I, the humid air 40 inside of the internal cavity 101 of the shroud 100 that contacts the leading edge 221 of the applicator nozzle 220.

The humid air 40 may be fed to the shroud 100 via the second supply line 22, whereby the humid air 40 reaches the shroud 100 by gravity feed. According to this embodiment, the second supply line 22 is positioned above the shroud 100 such that the humid 40 falls through the port 105 to the internal cavity 101 under the effects of gravity.

As the humid air 40 reaches the internal cavity 101, the humid air 40 first enters the upper region 102 of the internal cavity 101 and subsequently falls to the lower region 103 of the internal cavity 101 under the effects of gravity. As the humid air 40 is fed to the shroud 100, some of the humid air 40 may condense back into liquid water. In a non-limiting embodiment, the condensation of the humid air 40 may occur inside of the second supply line 22 or within the attachment element 160. The liquid water formed by condensation will also fall downward under the effects of gravity.

With the overlapping portion 178 of the baffle plate 170 at least partially blocking a line of sight between the upper region 102 and the lower region 103 of the internal cavity within the port 105, and with the baffle plate 170 oriented at the first angle $\theta_1$ relative to the top plate 120, the overlapping portion 178 may act as a shield to divert the liquid water away from the applicator nozzle 220. Additionally, with the wall 180 located within the overlapping portion 178 of the baffle plate 170, the wall 180 may further divert the liquid water away from the applicator nozzle 220 along the distal edge 174 of the cutout section 175, thereby effectively diverting the liquid water that has collected at a point adjacent to the proximal edge 173 of the baffle plate 170 and moving the liquid water to the distal edge 174 of the baffle plate 170 outside of the cutout section 175.

Under this configuration, the liquid water will be effectively diverted away from the applicator nozzle 220 of the applicator head 200 such that the liquid water will not interfere with the application of the coating composition to one or more surfaces 31, 32, 33, 34 of the workpiece 30.

The humid air 40 may reach the internal cavity 101 by gravity feed via the second supply line 22 from the humidifying apparatus 300 at a rate of about 75 CFM to about 160 CFM—including all sub-ranges and specific rates there-between. In a non-limiting embodiment, the humid air 40 may reach the internal cavity 101 by gravity feed via the second supply line 22 from the humidifying apparatus 300 at a rate of about 75 CFM to about 150 CFM—including all sub-ranges and specific rates there-between. In a non-limiting embodiment, the humid air 40 may reach the internal cavity 101 by gravity feed via the second supply line 22 from the humidifying apparatus 300 at a rate of about 110 CFM to about 150 CFM—including all sub-ranges and specific rates there-between. In a non-limiting embodiment, the humid air 40 may reach the internal cavity 101 by gravity feed via the second supply line 22 from the humidifying apparatus 300 at a rate of about 120 CFM to about 140 CFM—including all sub-ranges and specific rates there-between. In a non-limiting embodiment, the humid air 40 may reach the internal cavity 101 by gravity feed via the second supply line 22 from the humidifying apparatus 300 at a rate of about 130 CFM.

During operation of the coating system 1, a quantity of humid air 40 may enter the internal cavity 101 of the shroud 100 as the coating composition is applied to one or more surfaces 31, 32, 33, 34 of the workpiece 30 (referred to herein as the 'coating stage') via the applicator nozzle 220 of the applicator hear 200. The presence of the humid air 40 allows the coating composition to be applied at the high solids content without detrimental effects to coating quality. During the coating stage, the internal cavity 101 may be subject to a vacuum.

During the coating stage, the humid air 40 may contact one or more of the first major surface 31, the second major surface 32, the first side surface 33, or the second side surface 34 of the workpiece 30. After the workpiece 30 is coated with the coating composition, the coating composition may be dried to drive off any liquid carrier—thereby resulting in a 100% solid coating atop the workpiece 30.

Exemplary Claim Set

Exemplary Claim 1. A coating system comprising: an applicator head that is configured to apply a coating to a surface of a workpiece; a shroud comprising a housing and an internal cavity located inside of the housing; and a humidifying apparatus comprising an output that is fluidly coupled to the shroud, wherein the shroud can be altered between a first state and a second state, wherein in the first state the applicator head is at least partially located inside of the interval cavity and in the second state the applicator head is located outside of the internal cavity, and wherein in the first state the humidifying apparatus is configured to introduce a quantity of humid air to the internal cavity of the shroud that contacts the applicator head.

Exemplary Claim 2. The coating system according to any one of exemplary claims 1 to 2, wherein the applicator head comprises an applicator nozzle, and wherein in the first state the humidifying apparatus is configured to introduce the quantity of humid air to the internal cavity such that the humid air contacts the application nozzle, whereby the application nozzle configured to apply the coating to the surface of the workpiece.

Exemplary Claim 3. The coating system according to any one of exemplary claims 1 to 2, wherein the shroud is altered between the first state and the second state by moving the shroud relative to the applicator head.

Exemplary Claim 4. The coating system according to exemplary claim 3, wherein the shroud is altered between the first state and the second state by vertically moving the shroud relative to the applicator head.

Exemplary Claim 5. The coating system according to any one of exemplary claims 1 to 4, wherein the coating system further comprises a support apparatus comprising a frame and a conveyor, the conveyor configured to support the workpiece and the conveyor and the applicator head are configured to move relative to each other.

Exemplary Claim 6. The coating system according to exemplary claim 5, wherein the shroud is altered between the first state and the second state by moving the shroud relative to the support apparatus.

Exemplary Claim 7. The coating system according to exemplary claim 6, wherein the shroud is altered between the first state and the second state by vertically moving the shroud relative to the support apparatus.

Exemplary Claim 8. The coating system according to any one of exemplary claims 1 to 7, wherein the internal cavity is not subjected to a vacuum.

Exemplary Claim 9. The coating system according to any one of exemplary claims 1 to 8, wherein the shroud comprises a port that is configured to fluidly couple the internal cavity to the output of the humidifying apparatus.

Exemplary Claim 10. The coating system according to any one of exemplary claims 1 to 9, wherein the shroud comprises a top plate and a first side plate extending downward from the top plate.

Exemplary Claim 11. The coating system according to exemplary claim 10, wherein the port is located on the top plate of the shroud.

Exemplary Claim 12. The coating system according to any one of exemplary claims 10 to 11, wherein the first side plate comprises a first securing element and the support apparatus comprising a second securing element that is configured to interlock with the first securing element.

Exemplary Claim 13. The coating system according to exemplary claim 12, wherein the first state, the first securing element and the second securing element are interlocked.

Exemplary Claim 14. The coating system according to any one of exemplary claims 12 to 13, wherein the second state, the first securing element and the second securing element are not interlocked.

Exemplary Claim 15. The coating system according to any one of exemplary claims 11 to 14, wherein the port and the applicator head at least partially overlap in a vertical direction.

Exemplary Claim 16. The coating system according to any one of exemplary claims 1 to 15, wherein the humidifying apparatus comprises: an air moving-apparatus configured to move air; a steam generator configured to generate steam; a mixing apparatus configured to blend the steam with the air to form the humid air.

Exemplary Claim 17. The coating system according to exemplary claim 16, wherein the mixing apparatus comprises a mixing chamber and a static mixing element positioned within the mixing chamber.

Exemplary Claim 18. A coating system comprising: an applicator head that is configured to apply a coating to a surface of a workpiece; a shroud comprising: a housing; an internal cavity located inside of the housing; and a baffle located within the internal cavity; a humidifying apparatus comprising an output that is fluidly coupled to the shroud, wherein the humidifying apparatus is configured to introduce a quantity of humid air to the internal cavity of the shroud that contacts the applicator head.

Exemplary Claim 19. The coating system according to exemplary claim 18, wherein the shroud comprises a top plate and a port located on the top plate, the port configured to fluidly couple the internal cavity to an output of the humidifying apparatus.

Exemplary Claim 20. The coating system according to exemplary claim 19, wherein at least a portion of the baffle and the port overlap in a vertical direction.

Exemplary Claim 21. The coating system according to any one of claims 18 to 20, wherein the baffle comprises an upper major surface opposite a lower major surface, the baffle extending from a proximal edge to a distal edge, and the baffle comprises a cutout section that is formed into the distal edge.

Exemplary Claim 22. The coating system according to exemplary claim 21, wherein the cutout section at least partially overlaps with the port in a vertical direction.

Exemplary Claim 23. The coating system according to any one of exemplary claims 18 to 22, wherein the baffle comprises a wall extending upward from the upper major surface of the baffle.

Exemplary Claim 24. The coating system according to exemplary claim 23, wherein the wall follows the path of the cutout section of the baffle.

Exemplary Claim 25. The coating system according to any one of exemplary claims 18 to 24, wherein the applicator head comprises an applicator nozzle.

Exemplary Claim 26. The coating system according to exemplary claim 25, wherein the applicator nozzle and the distal edge of the baffle do not overlap in a vertical direction.

Exemplary Claim 27. The coating system according to any one of exemplary claims 19 to 26, wherein the baffle and the top plate are oriented at an oblique angle relative to each other.

Exemplary Claim 28. The coating system according to any one of exemplary claims 21 to 27, wherein the top plate comprises a lower surface that faces the internal cavity, and the lower surface of the top plate and the upper major surface of the baffle form a first angle ranging from about 10 to about 10°.

Exemplary Claim 29. The coating system according to any one of exemplary claims 19 to 28, wherein the shroud further comprises: a first side plate extending downward from the top plate; a second side plate extending downward from the top plate; and a third side plate extending downward from the top plate; wherein the second side plate is opposite the third side plate and the second side plate and the third side plate are substantially orthogonal to the first side plate.

Exemplary Claim 30. The coating system according to exemplary claim 29, wherein the quantity of humid air has a temperature ranging from about 70° F. to about 120° F.

Exemplary Claim 31. The coating system according to any one of exemplary claims 29 to 30, wherein the first side plate extends downward a first distance from the top plate to a first bottom edge, the second side plate extends downward a second distance from the top plate to a second bottom edge, the third side plate extends downward a third distance from the top plate to a third bottom edge, wherein the second and third distance are greater than the first distance.

Exemplary Claim 32. The coating system according to exemplary claim 30, wherein the quantity of humid air has a temperature ranging from about 85° F. to about 105° F.

Exemplary Claim 33. The coating system according to any one of exemplary claims 31 to 32, wherein the second distance and the third distance are equal.

Exemplary Claim 34. The coating system according to any one of exemplary claims 31 to 33, wherein the second side plate and third side plate comprise a stepped edge profile located on the respective second and third bottom edges and adjacent to the first side plate.

Exemplary Claim 35. The coating system according to exemplary claim 34, wherein the stepped edge profile is configured to receive at least a portion of an edge of the workpiece.

Exemplary Claim 36. The coating system according to any one of exemplary claims 29 to 35, wherein the coating system further comprises a support apparatus comprising a frame and a conveyor, the conveyor configured to support the workpiece, and the conveyor and the applicator head are configured to move relative to each other.

Exemplary Claim 37. The coating system according to exemplary claim 36, wherein the frame and the applicator head do not move relative to each other.

Exemplary Claim 38. The coating system according to exemplary claim 37, wherein the first side plate comprises a first securing element and the support apparatus comprises a second securing element that is configured to interlock with the first securing element.

Exemplary Claim 39. The coating system according to any one of exemplary claims 37 to 38, wherein conveyor is configured to move relative to the applicator head and the shroud.

Exemplary Claim 40. The coating system according to any one of exemplary claims 18 to 39, wherein the humidifying apparatus comprises: an air moving-apparatus configured to move air; a steam generator configured to generate steam; a mixing apparatus configured to blend the steam with the air to form the humid air.

Exemplary Claim 41. The coating system according to exemplary claim 40, wherein the mixing apparatus comprises a mixing chamber and a static mixing element positioned within the mixing chamber.

Exemplary Claim 42. A coating system comprising: an applicator head that is configured to apply a coating to a surface of a workpiece; a shroud comprising: a housing; and an internal cavity located inside of the housing; a humidifying apparatus comprising an output that is fluidly coupled to the shroud, the humidifying apparatus comprising: an air-moving device configured to move air; a steam generator configured to generate steam; a mixing apparatus comprising a mixing chamber configured to blend the steam with the air to form humid air; and wherein the humidifying apparatus is configured to introduce the humid air to the internal cavity of the shroud that contacts the applicator head.

Exemplary Claim 43. The coating system according to exemplary claim 42, wherein the humid air is gravity fed from the output of the humidifying apparatus to the internal cavity of the shroud.

Exemplary Claim 44. The coating system according to any one of exemplary claims 42 to 43, wherein the humid air is supplied to the internal cavity of the shroud at a rate of about 75 CFM to about 150 CFM.

Exemplary Claim 45. The coating system according to any one of exemplary claims 42 to 44, wherein the shroud comprises a port that is configured to fluidly couple the internal cavity to the output of the humidifying apparatus.

Exemplary Claim 46. The coating system according to anyone of exemplary claims 42 to 45, wherein the air is moved through the mixing chamber to the output of the mixing apparatus under pressure applied by the air-moving device.

Exemplary Claim 47. The coating system according to any one of exemplary claims 42 to 46, wherein the mixing apparatus comprises a mixing chamber a static mixing element is position within the mixing chamber.

Exemplary Claim 48. The coating system according to any one of exemplary claims 42 to 47, wherein the air-moving device comprises a fan configured to move air at a rate ranging from about 550 CFM to about 650 CFM.

Exemplary Claim 49. The coating system according to any one of exemplary claims 42 to 48, wherein the coating system further comprises a support apparatus comprising a frame and a conveyor, the conveyor configured to support the workpiece, and the conveyor and the applicator head are configured to move relative to each other.

Exemplary Claim 50. A method for coating a workpiece, the method comprising: a) supplying humid air to a coating assembly, the coating assembly comprising: an applicator head; and a shroud comprising an internal cavity whereby the applicator head is at least partially disposed inside of the internal cavity, and the humid air is supplied to the internal cavity of the coating assembly; b) moving the workpiece relative to the coating assembly; c) directing a coating composition onto a surface of the workpiece using the applicator head and exposing the surface of the workpiece to the humid air.

Exemplary Claim 51. The method according to exemplary claim 50, wherein steps a), b), and c) are performed concurrently.

Exemplary Claim 52. The method according to any one of exemplary claims 50 to 51, wherein the humid air is gravity fed to the internal cavity of the coating assembly.

Exemplary Claim 53. The method according to any one of exemplary claims 50 to 52, wherein the internal cavity is not under a vacuum during step c).

Exemplary Claim 54. The method according to any one of exemplary claims 50 to 53, wherein the coating composition has a solids content ranging from about 60 wt. % to about 90 wt. % based on the total weight of the coating composition.

Exemplary Claim 55. The method according to any one of exemplary claims 50 to 54, wherein the humid air has a relative humidity ranging from about 60% to about 90%.

Exemplary Claim 56. The method according to any one of exemplary claims 50 to 55, wherein the humid air is supplied to the internal cavity at a rate of about 100 CFM to about 150 CFM.

Exemplary Claim 57. The method according to any one of exemplary claims 50 to 56, wherein the humid air is fed to the internal cavity at a rate ranging from about 8 lb./hr. to about 10 lb./hr.

Exemplary Claim 58. The method according to any one of exemplary claims 50 to 57, wherein the humid air in step a) is formed from a humidifying apparatus that comprises a steam generator and a mixing apparatus.

Exemplary Claim 59. The method according to any one of exemplary claims 50 to 58, wherein the mixing apparatus comprising a mixing chamber and an air-moving device.

Exemplary Claim 60. The method according to exemplary claim 59, wherein the air is fed to the mixing chamber from the air-moving device and pure water vapor is fed to the mixing chamber from the steam generator, whereby the air and pure water vapor are blended to form the humid air.

Exemplary Claim 61. The method according to exemplary claim 60, wherein the air is fed to the mixing chamber at a rate ranging from about 550 CFM to about 650 CFM.

Exemplary Claim 62. The method according to any one of exemplary claims 60 to 61, wherein the pure water vapor is fed to the mixing chamber at a rate ranging from about 9 lb./hr. to about 13 lb./hr.

Exemplary Claim 63. The method according to any one of exemplary claims 50 to 62, wherein the shroud comprises a baffle located in the internal cavity, and wherein during step c) the baffle redirects condensation from the humid air away from the surface of the workpiece.

Exemplary Claim 64. The method according to any one of exemplary claims 50 to 63, wherein during step a) the shroud is in a first state and wherein prior to step a) the shroud is in a second state, wherein in the second state the applicator head is located outside of the internal cavity.

Exemplary Claim 65. The method according to exemplary claim 64, wherein the shroud moves relative to the applicator head to transition between the first state and the second state.

Exemplary Claim 66. The method according to any one of exemplary claims 64 to 65, further comprising a support apparatus configured to support the workpiece, wherein the applicator head and support apparatus move relative to each other.

Exemplary Claim 67. A method for coating a workpiece, the method comprising: a) supplying humid air to a coating assembly by a gravity feed, the coating assembly comprising: an applicator head comprising an applicator nozzle; and a shroud comprising an internal cavity and a baffle located inside of the internal cavity; whereby the applicator head is at least partially disposed inside of the internal cavity and the humid air is supplied to the internal cavity of the coating assembly; b) contacting the applicator head with the humid air as a coating composition is applied onto a surface of the workpiece using the applicator head, where by a condensation product of the humid air is directed away from the applicator nozzle by the baffle.

Exemplary Claim 68. The method according to exemplary claim 67, wherein steps a) and b) are performed concurrently.

Exemplary Claim 69. The method according to any one of exemplary claims 67 to 68, wherein the humid air contacts the applicator nozzle during step b).

Exemplary Claim 70. The method according to any one of exemplary claims 67 to 69, wherein the humid air contacts the surface of the workpiece during step b).

Exemplary Claim 71. The method according to any one of exemplary claims 67 to 70, wherein the internal cavity is not under a vacuum during step c).

Exemplary Claim 72. The method according to any one of exemplary claims 67 to 71, wherein the coating composition has a solids content ranging from about 60 wt. % to about 90 wt. % based on the total weight of the coating composition.

Exemplary Claim 73. The method according to any one of exemplary claims 67 to 72, wherein the humid air has a relative humidity ranging from about 60% to about 90%.

Exemplary Claim 74. The method according to any one of exemplary claims 67 to 73, wherein the humid air reaches the internal cavity at a rate of about 75 CFM to about 150 CFM.

Exemplary Claim 75. The method according to any one of exemplary claims 67 to 74, wherein the humid air is fed to the internal cavity at a rate ranging from about 8 lb./hr. to about 10 lb./hr.

Exemplary Claim 76. A method for coating a workpiece, the method comprising: a) supplying water vapor and moving air to a mixing chamber of a mixing apparatus, the mixing chamber of the mixing apparatus comprising a static mixer; b) blending the water vapor and moving air in the static mixer to form humid air; c) feeding the humid air from the mixing apparatus to a coating assembly, the coating assembly comprising: a shroud comprising an internal cavity; and an applicator head at least partially located in the internal cavity of the shroud; whereby the humid air reaches the internal cavity of the coating assembly; b) directing a coating composition onto a surface of the workpiece using the applicator head and exposing the surface of the workpiece to the humid air.

Exemplary Claim 77. The method according to exemplary claim 76, wherein the humid air is fed to the coating assembly in step b) by gravity feed.

Exemplary Claim 78. The method according to any one of exemplary claims 76 to 77, wherein the internal cavity is not under a vacuum during step b).

Exemplary Claim 79. The method according to any one of exemplary claims 76 to 78, wherein the coating composition has a solids content ranging from about 60 wt. % to about 90 wt. % based on the total weight of the coating composition.

Exemplary Claim 80. The method according to any one of exemplary claims 76 to 79, wherein the humid air has a relative humidity ranging from about 60% to about 90%.

Exemplary Claim 81. The method according to any one of exemplary claims 76 to 80, wherein the humid air reaches the internal cavity at a rate of about 75 CFM to about 150 CFM.

Exemplary Claim 82. The method according to any one of exemplary claims 76 to 81, wherein the humid air is fed to the internal cavity at a rate ranging from about 8 lb./hr. to about 10 lb./hr.

Exemplary Claim 83. The method according to any one of exemplary claims 76 to 82, wherein the moving air is fed to the mixing chamber at a rate ranging from about 550 CFM to about 650 CFM.

Exemplary Claim 84. The method according to any one of exemplary claims 76 to 83, wherein the water vapor is fed to the mixing chamber at a rate ranging from about 9 lb./hr. to about 13 lb./hr.

What is claimed is:

1. A method for coating a workpiece, the method comprising:

a) supplying humid air to a coating assembly, the coating assembly comprising:
  an applicator head; and
  a shroud comprising a housing defining an internal cavity, the housing comprising:
    a top plate;
    a first side plate extending downward from the top plate;
    a second side plate extending downward from the top plate; and
    the first side plate being opposite the second side plate;
    a first axis A-A intersecting the first side plate and the second side plate;
  whereby the applicator head is at least partially disposed inside of the internal cavity and the humid air is supplied to the internal cavity of the coating assembly;

b) conveying the workpiece on a conveyor configured to support the workpiece along a machine direction MD such that the conveyor and the applicator head move relative to each other, the machine direction MD being parallel to the first axis A-A of the shroud, while the workpiece is positioned between the first side plate and the second side plate; and c) directing a coating composition onto a surface of the workpiece using the applicator head and exposing the surface of the workpiece to the humid air;

wherein during step a) the shroud is in a first state and wherein prior to step a) the shroud is in a second state, wherein in the second state the applicator head is located outside of the internal cavity.

2. The method according to claim 1, wherein steps a), b), and c) are performed concurrently.

3. The method according to claim 1, wherein the humid air is gravity fed to the internal cavity of the coating assembly.

4. The method according to claim 1, wherein the internal cavity is under a vacuum during step c).

5. The method according to claim 1, wherein the coating composition has a solids content ranging from about 60 wt. % to about 90 wt. % based on the total weight of the coating composition.

6. The method according to claim 1, wherein the humid air has a relative humidity ranging from about 60% to about 90%.

7. The method according to claim 1, wherein the humid air is supplied to the internal cavity at a rate of about 75 CFM to about 150 CFM.

8. The method according to claim 1, wherein the humid air is fed to the internal cavity at a rate ranging from about 8 lb./hr. to about 10 lb./hr.

9. The method according to claim 1, wherein the humid air in step a) is formed from a humidifying apparatus that comprises a steam generator and a mixing apparatus.

10. The method according to claim 9, wherein the mixing apparatus comprises a mixing chamber and an air-moving device.

11. The method according to claim 10, wherein the air is fed to the mixing chamber from the air-moving device and water vapor is fed to the mixing chamber from the steam generator, whereby the air and water vapor are blended to form the humid air.

12. The method according to claim 10, wherein the air is fed to the mixing chamber at a rate ranging from about 550 CFM to about 650 CFM.

13. The method according to claim 10, wherein the water vapor is fed to the mixing chamber at a rate ranging from about 9 lb./hr. to about 13 lb./hr.

14. The method according to claim 1, wherein the shroud comprises a baffle located in the internal cavity, and wherein during step c) the baffle redirects condensation from the humid air away from the surface of the workpiece.

15. The method according to claim 1, wherein the shroud moves relative to the applicator head to transition between the first state and the second state.

16. The method according to claim 1, further comprising a support apparatus configured to support the workpiece, wherein the applicator head and support apparatus move relative to each other.

17. The method of claim 1, wherein the top plate comprises a port that fluidly couples the internal cavity to an output of a humidifying apparatus, the humid air being supplied by gravity feed through the port, and wherein a baffle within the internal cavity at least partially overlaps the port and includes a cutout formed into a distal edge and a wall extending upward from the baffle that extends through the port and above the top plate, the baffle and the wall being configured to divert condensation away from an applicator nozzle of the applicator head.

18. The method of claim 1, wherein bottom edges of the first side plate and the second side plate are located beneath the conveyor during coating, and wherein at least one of the first side plate and the second side plate includes a stepped edge profile configured to receive at least a portion of an edge of the workpiece.

19. The method of claim 1, wherein the shroud transitions between-a first state and a second state the first state and the second state by vertically moving relative to the applicator head, and wherein a first securing element on the shroud interlocks with a second securing element on a support frame in the first state and is not interlocked in the second state.

* * * * *